US010681388B2

(12) United States Patent
Covell et al.

(10) Patent No.: US 10,681,388 B2
(45) Date of Patent: Jun. 9, 2020

(54) COMPRESSION OF OCCUPANCY OR INDICATOR GRIDS

(71) Applicant: GOOGLE LLC, Mountain View, CA (US)

(72) Inventors: Michele Covell, Woodside, CA (US); David Marwood, Sunnyvale, CA (US); Shumeet Baluja, San Diego, CA (US); Rahul Sukthankar, Orlando, FL (US)

(73) Assignee: GOOGLE LLC, Mountain View, CA (US)

( * ) Notice: Subject to any disclaimer, the term of this patent is extended or adjusted under 35 U.S.C. 154(b) by 374 days.

(21) Appl. No.: 15/883,639

(22) Filed: Jan. 30, 2018

(65) Prior Publication Data
US 2019/0238893 A1    Aug. 1, 2019

(51) Int. Cl.
*H04N 19/44*    (2014.01)
*H04N 19/463*    (2014.01)
(Continued)

(52) U.S. Cl.
CPC ........... *H04N 19/91* (2014.11); *H04N 19/13* (2014.11); *H04N 19/14* (2014.11);
(Continued)

(58) Field of Classification Search
CPC ...... H04N 19/13; H04N 19/14; H04N 19/176; H04N 19/44; H04N 19/463; H04N 19/91
See application file for complete search history.

(56) References Cited

U.S. PATENT DOCUMENTS 5,474,693 A * 12/1995 Kapuscinski ............. C08F 8/00
                                                                508/221
5,729,676 A *  3/1998 Inoue ........................ G06F 8/20
                                                                712/206
(Continued)

FOREIGN PATENT DOCUMENTS

WO    1993012610 A1    6/1993

OTHER PUBLICATIONS

Mohamed et al. ("Binary image compression using efficient partitioning into rectangular regions," IEEE Transactions on Communications, Vo. 43, No. 5 , May 1995) (Year: 1995).*
(Continued)

*Primary Examiner* — Yubin Hung
(74) *Attorney, Agent, or Firm* — Young Basile Hanlon & MacFarlane, P.C.

(57) ABSTRACT

Encoding and decoding occupancy information is disclosed. A method includes determining row sums for the region, determining column sums for the region, encoding, in a compressed bitstream, at least one of the row sums and the column sums, and encoding, in the compressed bitstream and based on a coding order, at least one of the rows and the columns of the region. The coding order is based on the encoded at least one of the row sums and the column sums. The row sums include, for each row of the region, a respective count of a number of locations in the row having a specified value. The column sums include, for each column of the region, a respective count of a number of locations in the column having the specified value. A location having the specified value is indicative of the occupancy information at the location.

20 Claims, 16 Drawing Sheets

(51) Int. Cl.
*H04N 19/91* (2014.01)
*H04N 19/176* (2014.01)
*H04N 19/14* (2014.01)
*H04N 19/13* (2014.01)

(52) U.S. Cl.
CPC ........... *H04N 19/176* (2014.11); *H04N 19/44* (2014.11); *H04N 19/463* (2014.11)

(56) References Cited

U.S. PATENT DOCUMENTS

| | | | |
|---|---|---|---|
| 6,285,994 B1* | 9/2001 | Bui | G06F 16/2237 707/745 |
| 6,925,121 B1* | 8/2005 | Komiya | H04N 19/51 348/699 |
| 7,847,799 B2 | 12/2010 | Taubin | |
| 9,554,153 B2 | 1/2017 | Fenney | |
| 2003/0202602 A1 | 10/2003 | Apostolopoulos et al. | |
| 2007/0133889 A1* | 6/2007 | Horie | H04N 19/85 382/232 |
| 2009/0016453 A1* | 1/2009 | Monro | H03M 7/30 375/241 |
| 2019/0190544 A1* | 6/2019 | Li | H04L 1/0057 |

OTHER PUBLICATIONS

Hunag et al. ("A Generic Scheme for Progressive Point Cloud Coding," IEEE Transactions on Visualization and Computer Graphics, vol. 14, No. 2, Mar.-Apr. 2008) (Year: 2008).*

International Search Report and Written Opinion in PCT/US2019/012646, dated Apr. 11, 2019, 11 pgs.

SM Aghito, et al., "Context based coding of binary shapes by object boundary straightness analysis", Proceedings of the Data Compression Conference, IEEE Computer Society (Piscataway, NJ), Mar. 23, 2004, pp. 399-408.

Radu Danescu, et al., "Particle Grid Tracking System Stereovision Based Obstacle Perception in Driving Environments", IEEE Intelligent Transportation Systems Magazine, vol. 4, No. 1 (IEEE, USA), Apr. 1, 2012, pp. 6-20.

Ulug Bayazit et al., "Predictive vector quantization of 3-D mesh geometry by representation of vertices in local coordinate systems", Journal of Visual Communication and Image Representation, vol. 18, No. 4 (Academic Press, Inc, US), Jun. 27, 2007, pp. 341-353.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Nick Johnston et al; "Improved Lossy Image Compression with Priming and Spatially Adaptive Bit Rate for Recurrent Networks"; Mar. 29, 2017; pp. 1-9.

Johannes Balle et al.; "End to End Optimized Image Compression"; Published Conference Paper at ICLR 2017; Mar. 3, 2017; pp. 1-27.

* cited by examiner

COMPRESSION OF OCCUPANCY OR INDICATOR GRIDS

BACKGROUND

Compression, sometimes called "encoding," is used to represent visual information using a minimum amount of bits. Images have statistical properties that can be exploited during compression, thereby making image compression techniques better than general purpose binary data compression techniques. Videos, being sequences of images, also have the same exploitable properties. Lossy compression techniques are commonly used to compress images. Such lossy techniques sacrifice finer details of the image in order to obtain a greater rate of compression. When a lossy-compressed image is decompressed, or decoded, the resulting image lacks the fine details that were sacrificed.

SUMMARY

One aspect of the disclosed implementations is a method of encoding occupancy information in a region of an image, the region having rows and columns. The method includes determining row sums for the region, determining column sums for the region, encoding, in a compressed bitstream, at least one of the row sums and the column sums, and encoding, in the compressed bitstream and based on a coding order, at least one of the rows and the columns of the region. The coding order is based on the encoded at least one of the row sums and the column sums. The row sums include, for each row of the region, a respective count of a number of locations in the row having a specified value. The column sums include, for each column of the region, a respective count of a number of locations in the column having the specified value. A location having the specified value is indicative of the occupancy information at the location.

Another aspect is an apparatus for decoding occupancy information in a region of an image, the region comprising rows and columns, the apparatus includes a memory and a processor configured to execute instructions stored in the memory to determine a base probability, receive, in a compressed bitstream, at least one of row sums and column sums, and decode, from the compressed bitstream and based on a decoding order, at least one of the rows and the columns of the region. The decoding order is based on the received at least one of the row sums and the column sums. The base probability is a probability of a location having a value in the region. The location having the value is indicative of the occupancy information at the location. The row sums include, for each row of at least some of the rows of the region, a respective count of a number of locations having the value in the row. The column sums include, for each column of at least some of the columns of the region, a respective count of a number of locations having the value in the column.

Another aspect is an apparatus for encoding a region of an image, the region having rows and columns, the apparatus includes a memory and a processor configured to execute instructions stored in the memory to determine row sums for the region, determine column sums for the region, encode, in a compressed bitstream, at least one of the row sums and the column sums, and encode, in the compressed bitstream and based on a coding order, at least some one of the rows and the columns of the region. The coding order is based on the encoded at least one of the row sums and the column sums. The row sums include, for each row of at least some rows of the region, a respective count of a number of locations having a specified value. The column sums include, for each column of at least some columns of the region, a respective count of a number of locations having the specified value.

These and other aspects of the present disclosure are disclosed in the following detailed description of the embodiments, the appended claims, and the accompanying figures.

DETAILED DESCRIPTION

Lossy compression can be used to code visual information of an image. However, for some applications, loss of visual information is unacceptable. For example, some techniques for compressing images include describing vertices of triangles. Each vertex can then be given a color. The colored vertices are then used to color (e.g., reconstitute) the image. In another example, a neural network may be trained to detect features in images. The neural network may define the features (i.e., descriptors) as sets of grid points (e.g., vertices). In yet another example, sections of a text in an image may be marked for subsequent optical character recognition (OCR). Each section of the text can be marked using a rectangle that bounds the region. The rectangle can be defined using the grid locations of its four vertices. Vertices are also referred to herein as occupied locations; and non-vertices are also referred to as non-occupied locations. Lossless techniques, as opposed to lossy techniques, are used to compress (i.e., encode) the location indicators (also referred to herein as locations of the vertices or occupancy values).

Figure 8A:
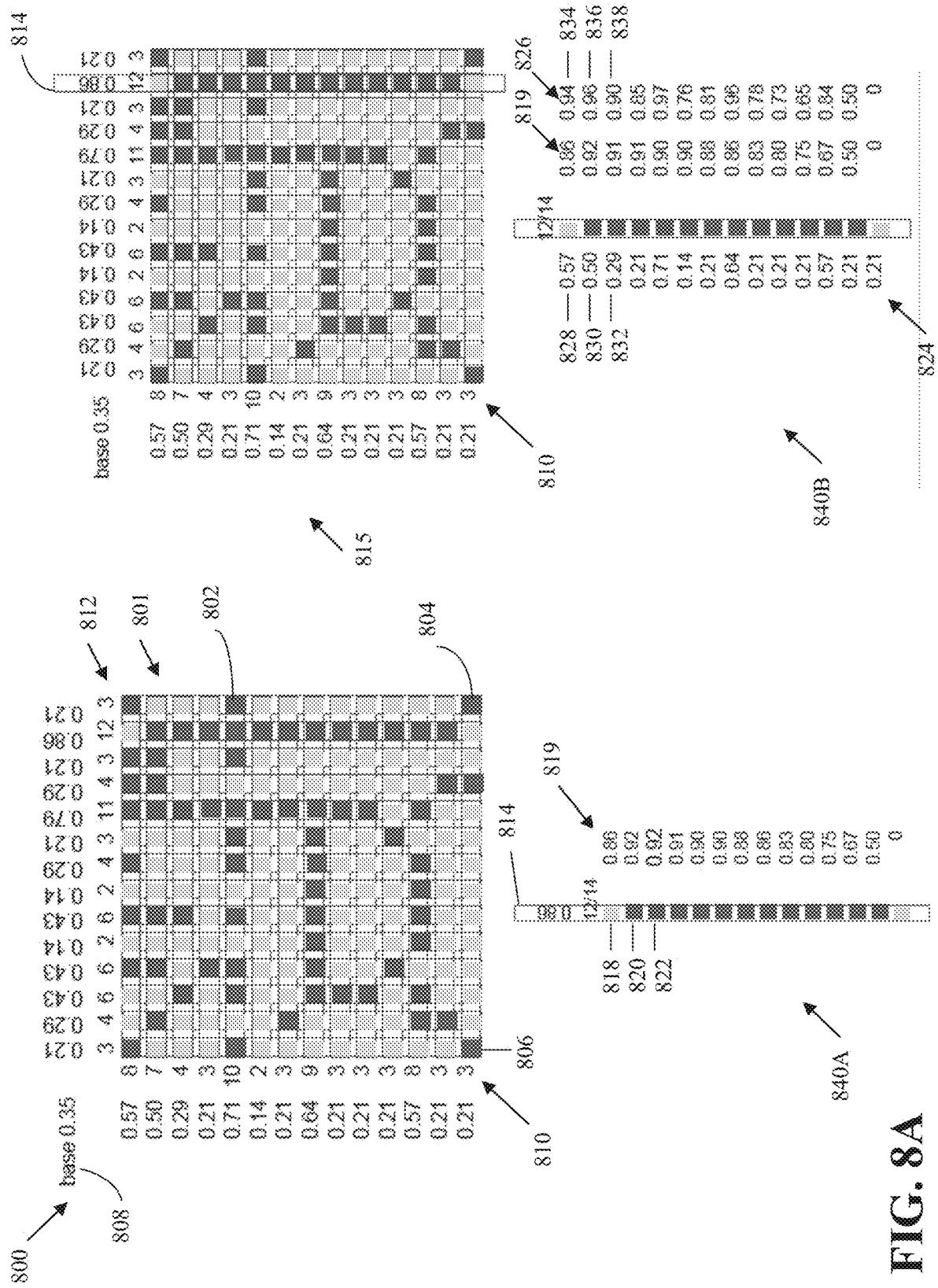
FIGS. 8A-8F are diagrams of an example of compression of occupancy or indicator grids according to implementations of this disclosure.

FIG. 8A includes a diagram 800. The diagram 800 illustrates a region 801 of an image. The region 801 is 14×14 pixels in size. Each pixel is indicated by a square. Overlaid on the region 801 is a set of grid points indicated by the dark-gray squares, such as vertices 802, 804, 806. The vertices 802, 804, 806 correspond, respectively, to the Cartesian locations (13, 4), (13, 13), and (0, 13) of the region 801. Location (0, 0) is the top-left corner of the region 801. The light-colored pixels are not vertices.

Regardless of the color of the pixel in the region 801, a vertex may be indicated by a predefined bit value and a non-vertex may be indicated by the complement bit value. The predefined bit value and its complement may be, respectively, 1 and 0, 0 and 1, or any other values. As such, column 814 of FIG. 8A can be represented by the bit string 0111111111110, which indicates that the column 814 includes a first non-vertex, followed by 12 vertices, and followed by a non-vertex.

The location indicators can be encoded in a bitstream using run-length encoding. In an example of run-length encoding, a two-dimensional image or a region thereof may be processed as a unary structure based on a scan order. The scan order can be a raster scan order, a zig-zag scan order, or any other scan order. Run-length encoding encodes the number of times a symbol is seen followed by the symbol itself. For example, the string 0111111111110 may be encoded as 1012110 (i.e., 1 occurrence of the zero symbol, followed by 12 occurrences of the one symbol, followed by 1 occurrence of the zero symbol). In another example, a two-dimensional extension of run-length encoding can be used whereby a first run-length encoding is used for each, e.g., row along with a second "run length" indicating the number of rows that exhibit at least the same profile of zeros (or ones) indicated by the first run length thereby creating a rectangle of zeros; after the first row, the not-yet coded sections are encoded by skipping those sections already encoded.

In another alternative, the location indicators can be coded (i.e., encoded by an encoder and decoded by a decoder) using entropy coding. Entropy coding is a technique for "lossless" coding that relies upon probability models that model the distribution of values occurring in, e.g., the region of the image being encoded. By using probability models (i.e., probability distributions) based on a measured or estimated distribution of values, entropy coding can reduce the number of bits required to represent data (e.g., image or video data) close to a theoretical minimum. In practice, the actual reduction in the number of bits required to represent video data can be a function of the accuracy of the probability model, the number of bits over which the coding is performed, and the computational accuracy of fixed-point arithmetic used to perform the coding. A probability distribution can be used by an entropy coding engine, such as arithmetic coding, Huffman coding, and other variable-length-to-variable-length coding engines.

In arithmetic coding, it is possible to use less than one bit per symbol using range encoding or asymmetric number systems (ANS) coding. The symbols can be the bit values 1 and 0 indicating, respectively, that a current grid location is a vertex (i.e., an occupied location) or not a vertex (i.e., a non-occupied location). Having an accurate estimate of the relative probabilities of the 0 and 1 symbols/bits at a current location being coded is key to optimizing the compression performance.

In a progressive arithmetic coding method, the probability distribution can be adjusted after coding each grid location. The adjusted probability distribution can be used to code the next grid location. For example, an encoder can first send a count of the number of occupied grid points (e.g., the number of grid points having the value one (1)). "Send" can mean transmit to a decoder via an encoded bitstream, encode in a stored bitstream that can be later decoded by a decoder, and the like. The count of the number of occupied grid points can be encoded in and decoded (by a decoder) from the bitstream.

In some implementations, the count of the number of occupied grid points can be known by the encoder and the decoder. As such, the count is not sent by the encoder. For example, in a case of performing image compression using vertices and triangles, the number of allowed vertices may be known a priori to the encoder and the decoder. For example, a codec may partition an image (e.g., a still image of a frame of video sequence) into regions (i.e., blocks, grids, etc.) for processing. The codec may be configured to use a respective predefined number of vertices per grid/region size. For example, for a 128×128 grid, the predefined number of vertices can be 25. In another example, for a grid of size 100×100, the predefined number of vertices can be 34. Other relationships of grid sizes to grid points can be available. In yet another example, the number of vertices can be configured to be a percentage of the number of grid locations. For example, the number of vertices can be 10% of the total number of grid locations.

For the very first grid point, the probability that the first grid point is occupied (i.e., has a value of 1) is given by equation (1):

$$P(\text{occupied}) = \frac{\text{sent/known count of occupied grid points}}{\text{number of grid points}} \quad (1)$$

For all subsequent grid points, the best probability estimate for the next grid point being occupied (e.g., equal to 1) is given by equation (2)

$$P(\text{occupied}) = \frac{\text{remaining count of occupied grid points}}{\text{remaining number of grid points}} \quad (2)$$

As the number of already coded occupied grid points as well as the total number of coded grid points (occupied and otherwise) are known by the encoder and the decoder, the decoder can update the probability estimates without additional information (e.g., syntax elements in the compressed bitstream) from the encoder.

The diagram 800 of FIG. 8A is now used as an example. The encoder can send (or the encoder and the decoder can know) a count of the occupied grid points in the region 801. That is, the encoder can send (or the decoder can know) the number of dark grid points (i.e., 69 vertices in the region 801). Using this count, and the size of the region 801 (i.e., 14*14=196), the encoder and the decoder can calculate an initial of the base probability 808 of occupied grid points in the region 801 using equation (1). The base probability is 0.35 (i.e., 69/196). It is noted that, for illustration purposes, all probability values used herein are rounded to two decimal points. For example, 69/196=0.6820708 is rounded to 0.35. In an actual implementation, probability values may be computed by both an encoder and a decoder to a previously determined precision, such as $2^{-13}$. The rounding can be to a sufficiently coarse precision such that errors that may be caused by floating point arithmetic do not lead to drift between the encoder and the decoder.

The base probability 808 (i.e., 0.35) can be used by an entropy coder to code the grid point at location (0, 0). As the grid point at location (0, 0) is occupied, the grid point at location (0, 1) can be coded using the probability of equation 2, namely P(occupied)=(69−1)/(196−1). As the grid point at location (0, 1) is not occupied, the grid point at location (0, 2) can be coded using the probability of equation 2, namely P(occupied)=68/(195−1).

The efficiency of entropy coding can be directly related to the probability model. A model, as used herein, can be, or can be a parameter in, a lossless (entropy) coding. A model can be any parameter or method that affects probability estimation for entropy coding.

From information theory, the entropy H(X) can be a measure of the number of bits required to code the variable X; and the conditional entropy H(X|Y) can be a measure of the number of bits required to code the variable X given that the quantity Y is known. H(X) and H(X|Y) are related by the well-known property H(X|Y)≤H(X). That is, the conditional entropy H(X|Y) can never exceed H(X).

If X represents whether a grid location in a row (or column) is occupied and Y represents one or both of the number of occupied grid points in a row or column that includes the grid location, it follows that coding of whether the grid location is occupied (i.e., X) may be improved by using the number of occupied grid location in the row or column that includes the grid location (i.e., Y). For example, the number of occupied grid points in the row or column that includes the grid point can be used to improve the probability of coding whether the grid point is occupied (e.g., =1) or not occupied (e.g., =0).

In a case where occupancy information is indicated with 0 and 1 (e.g., integer or bit) values where a value of 1 indicates that a grid point is occupied and a value of 0 indicates that the grid point is not occupied, the number of occupied grid points in a row (or column) is referred to as a row sum (or column sum). For example, the column 814 of FIG. 8A has a column sum of 12.

Implementations according to this disclosure can improve the compression performance of coding occupancy or indicator grids. For example, whereas 179.36 bits are required using simple progressive arithmetic to code the occupancy information of the region 801 of FIG. 8, 131.81 bits are required when row sums are used, 126.62 bits are used when column sums are used, and 67.39 bits are required when the row sums and the column sums are used in combination. The aforementioned bit values are exclusive of bits required to encode row and/or column sums. For example, using a simple binomial distribution model, 38.96 additional bits may be required to code the row sums and 47.14 bits to code the column sums. In this example, the savings (in bits) of using the combined projections (i.e., when the row sums and the column sums are used in combination) is the greatest; namely using the combined projections results in a 14.4 improvement over simple progressive arithmetic.

It should be noted that the compression savings (or, in some cases, the lack of savings) depends on the occupancy map that is being compressed. Accordingly, an encoder can test some or all of the available alternatives (e.g., encoding using simple progressive arithmetic coding, encoding using row sums, encoding using column sums, and encoding using both row sums and column sums) and signal to the decoder the alternative selected by the encoder (i.e., the alternative that results in the smallest number of bits).

Details of compression of occupancy or indicator grids are described herein with initial reference to a system in which the teachings herein can be implemented.

Figure 1:
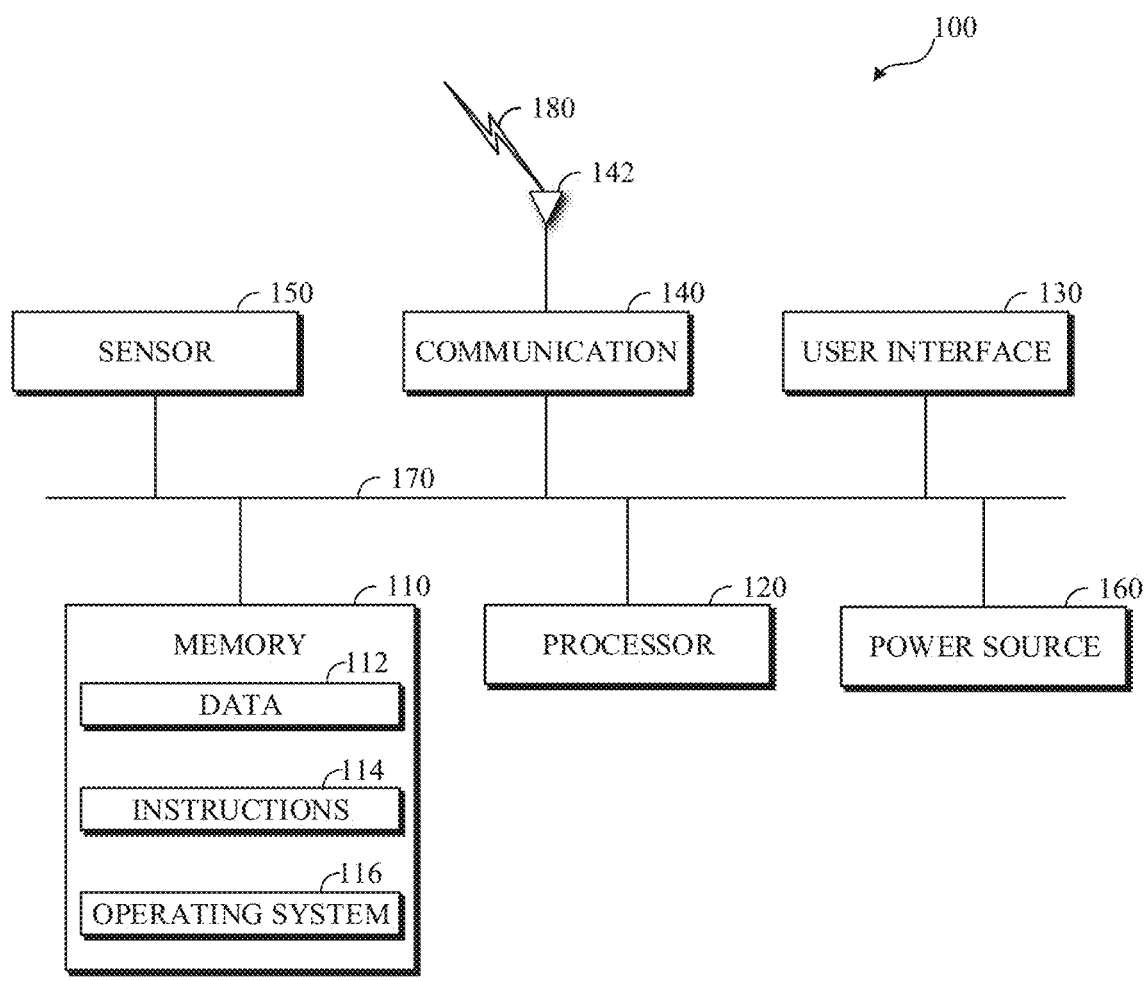
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown as a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio and/or visual data, encoded audio and/or visual data, decoded audio and/or visual data, or the like. The visual data can include still images, frames of video sequences, and/or video sequences. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
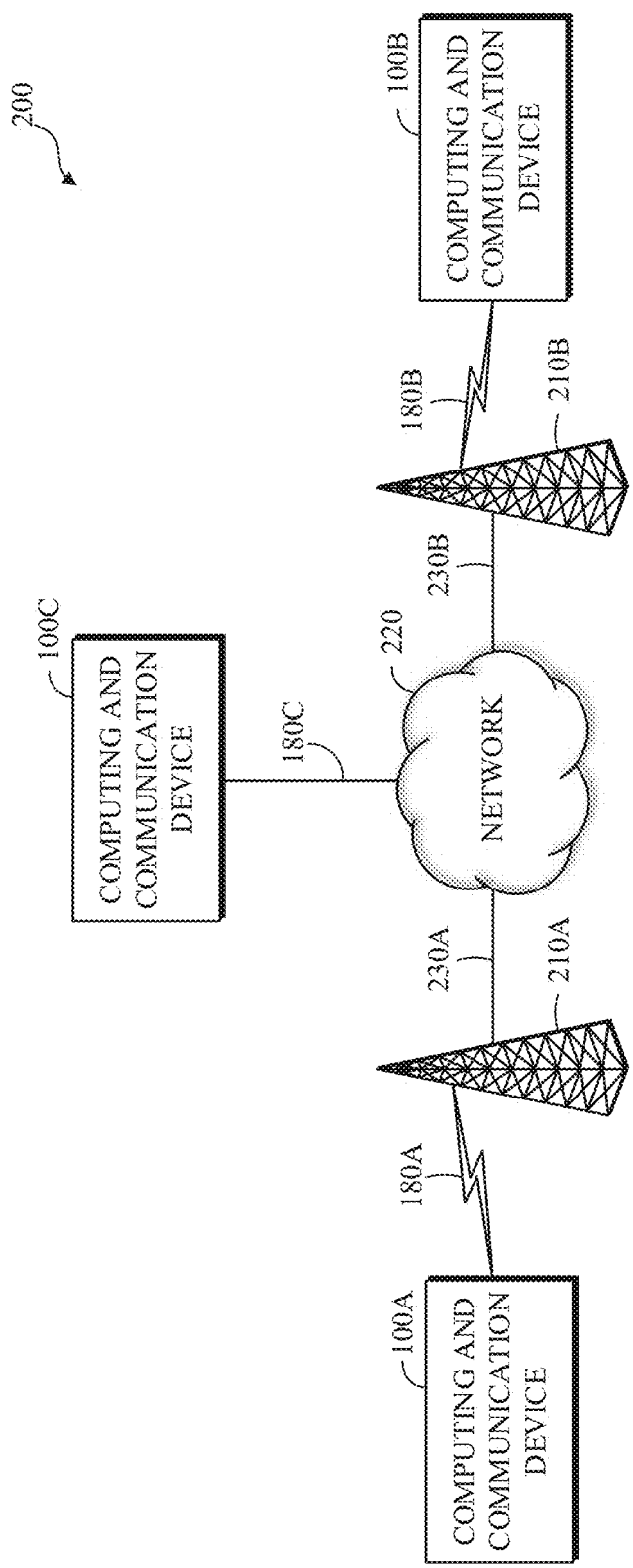
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
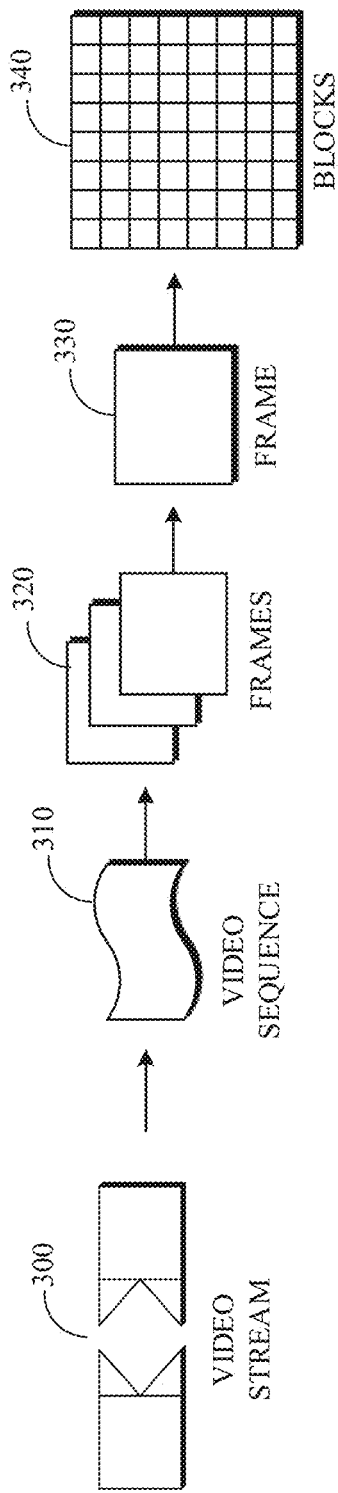
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

In some implementations, a frame that is not part of a video stream is encoded and decoded in accordance with implementations of this disclosure.

Figure 4:
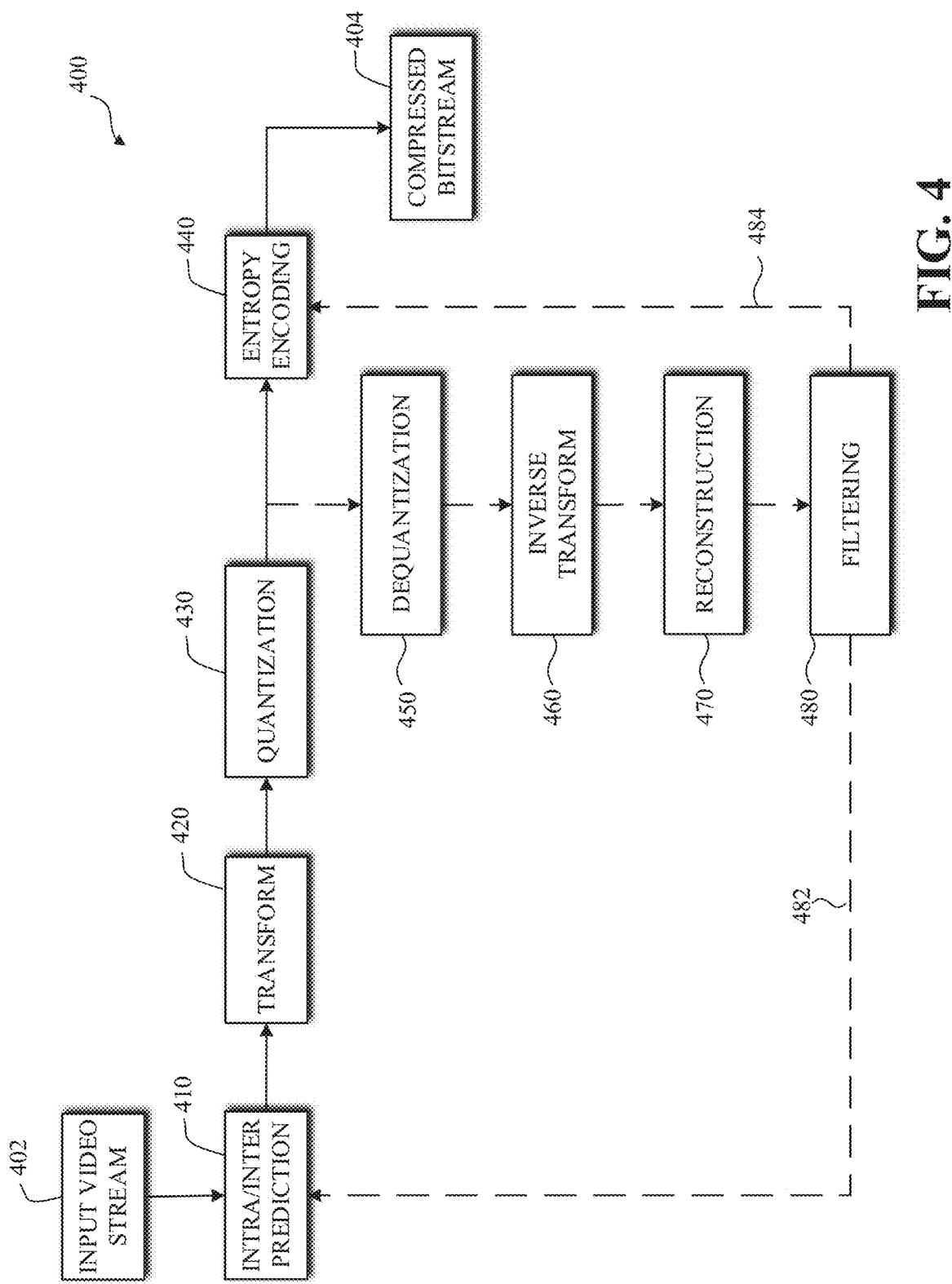
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The input video stream 402 can be a single image or a collection of images. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame. In the case of encoding a single image (e.g., an image that is not part of a video sequence and/or a sequence of images), the intra/inter prediction unit 410 can encode the image using intra-frame prediction.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
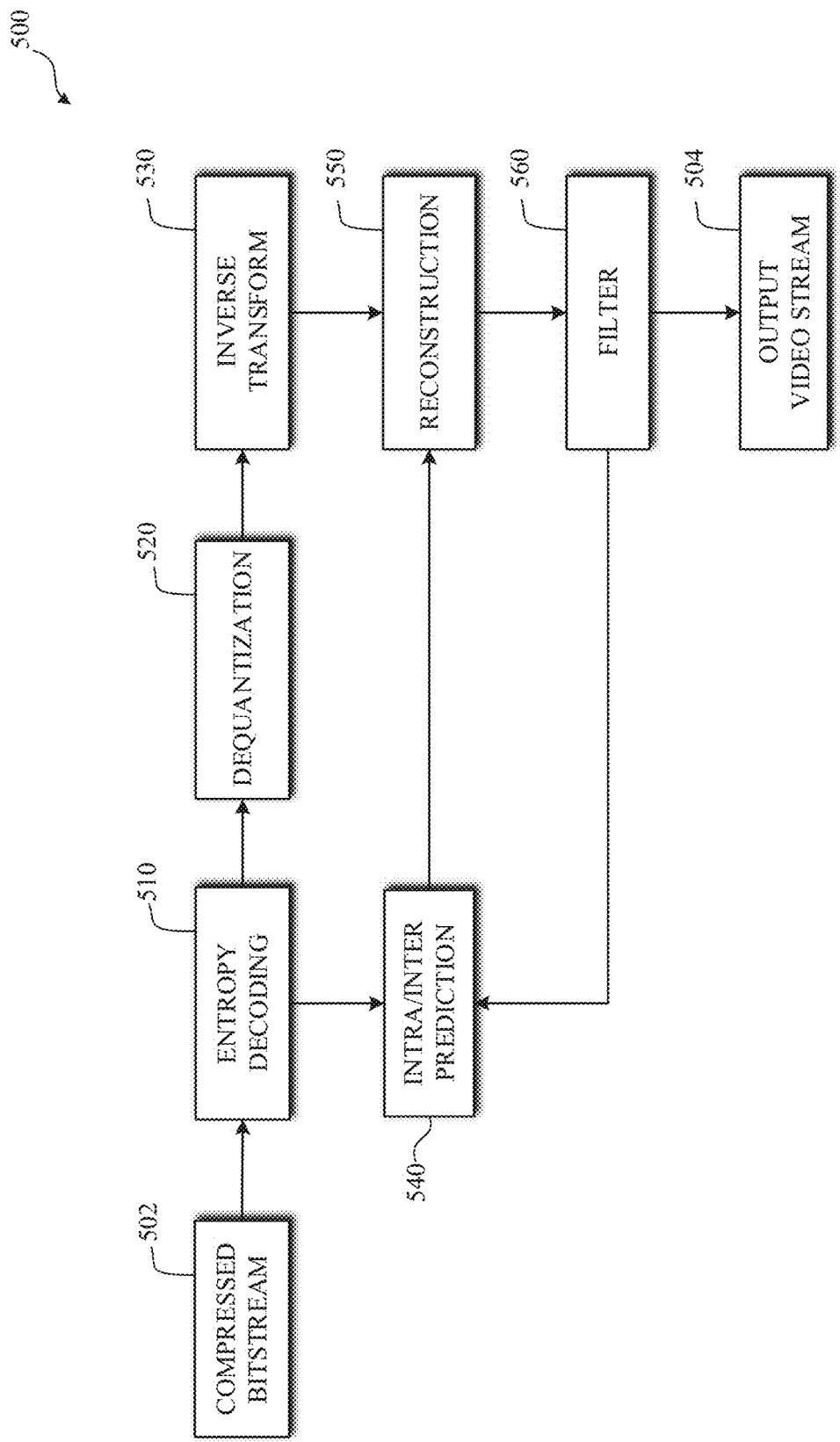
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
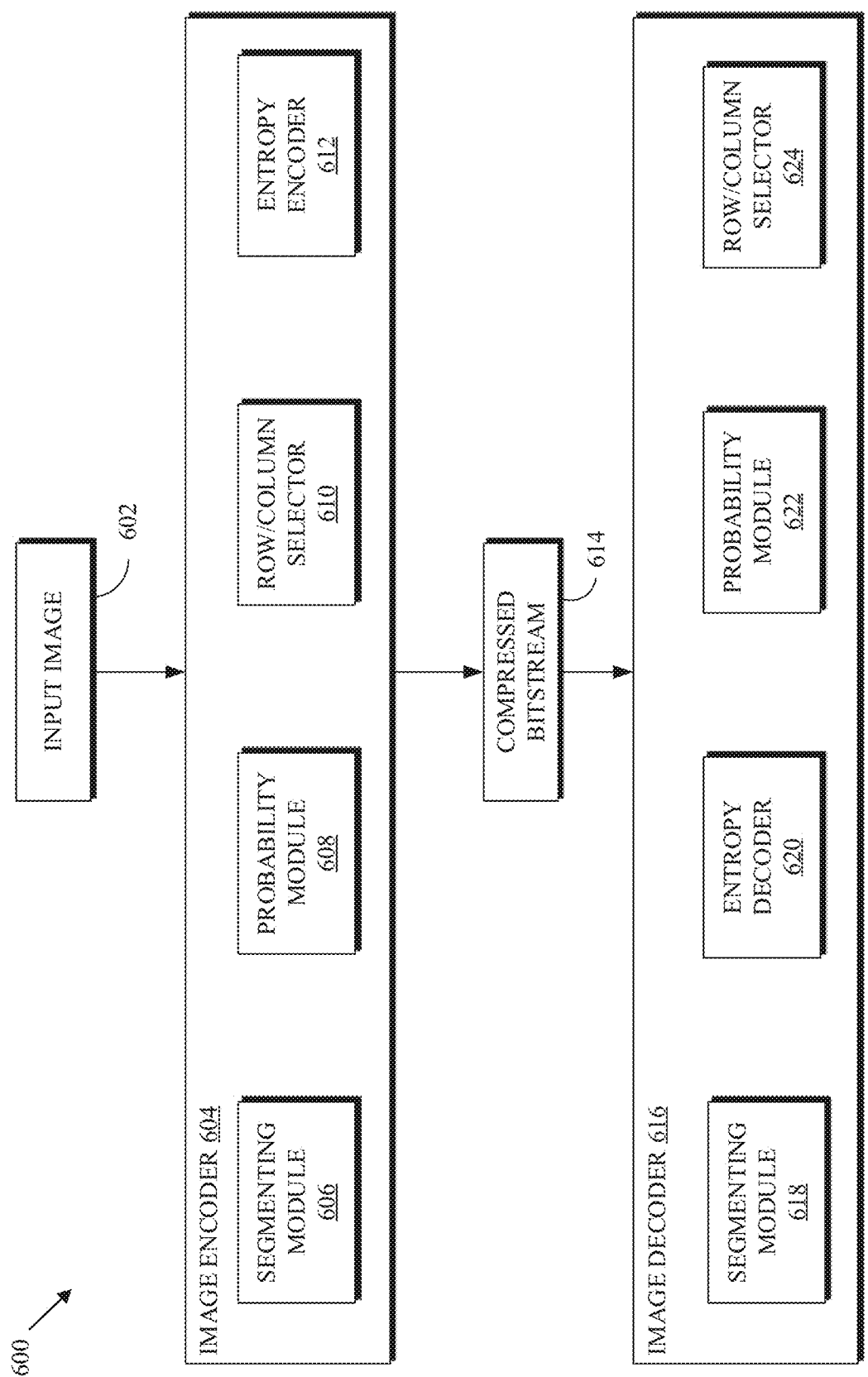
FIG. 6 is a block diagram illustrating modules for encoding and/or decoding an image according to implementations of this disclosure.

FIG. 6 is a block diagram 600 illustrating modules for encoding and/or decoding an image according to implementations of this disclosure. Some embodiments have different and/or other modules than the ones described herein, and the functions can be distributed among the modules in a different manner than is described here.

The diagram 600 includes an image encoder 604 and an image decoder 616. The image encoder 604 can be implemented by an encoder, such as the encoder 400 of FIG. 4. The image decoder 616 can be implemented by a decoder, such as the decoder 500 of FIG. 5. The image encoder 604 processes regions of an input image. A region is a two-dimensional area of the image including a first dimension and a second dimension. The first dimension can be a row or a column and the second dimension can be the other of the row and the column. The image encoder 604 encodes, such as into a compressed bitstream 614, rows and columns of a current region. The compressed bitstream 614 can be compressed bitstream 404 of FIG. 4 or the compressed bitstream 502 of FIG. 5. The region can be a block as described with respect to the blocks 340 of FIG. 3.

The image encoder 604 can include a segmenting module 606, a probability module 608, a row/column selector 610, and an entropy encoder 612. The image encoder 604 receives an input image 602. The input image 602 can be a frame of a video sequence. The input image can be a portion of an image. For example, the input image 602 can be a region of an image, such as the region 801 of FIG. 8A. In an implementation, the image encoder 604 can receive an image and partition the image into regions. Each region of the image is processed by the image encoder as further described below.

The segmenting module 606 splits a current region (i.e., a region being processed) into sub-tiles. The sub-tiles are such that each sub-tile is composed mostly non-vertices or mostly of vertices, as further described below. How the current region is split into sub-tiles is encoded into the bitstream 614. Some implementations of the image encoder 604 may not include the segmenting module 606. As such, a current region is not split into sub-tiles and segmentation information is not included in the compressed bitstream 614. Segmenting a region into sub-tiles is further described with respect to FIGS. 9-7.

The probability module 608 maintains (e.g., calculates, updates, etc.) the number of un-encoded vertices in a current region. The number of un-encoded vertices in the current region can include the number of un-encoded vertices for the current region, the number of un-encoded vertices for at least some of the rows of the current region, and/or the number of un-encoded vertices for at least some of the columns of the current region.

Referring to FIG. 8A as an example, before encoding the column 814, the probability module 608 can maintain (e.g., store) the number of un-encoded vertices (i.e., 69), the number of un-encoded vertices for at the rows of region 801 (i.e., row sums 810), and the number of un-encoded vertices for at the columns of region 801 (i.e., column sums 812). After encoding the column 814, the probability module 608 can update the number of un-encoded vertices to 57 (i.e., 69–12) and the number of un-encoded vertices as shown in diagram 815 of FIG. 8A. The row sums 810 of each of the second row (e.g., row index 1) to the thirteenth row (e.g., row index 12) is reduced by 1. The row sums 810 and the column sums 812 can be used by the probability module 608 to determine the probability distribution of coding whether a grid location is or is not a vertex as further described below with respect to FIG. 7. For example, after encoding the column 814, the probability module 608 can be used to calculate the progressive probabilities 819 of diagram 840A.

The row/column selector 610 determines which row or column to encode next. A Row or a column can be referred to collectively as a "line." Encoding a line means to encode the un-encoded grid locations of the line. For example, and referring to FIG. 8B, which illustrates encoding row 841, grid location 839 is not encoded as part of encoding the row 841 because the grid location 839 is already encoded with the column 814. As such, encoding the row 841 means to encoding 13 values (instead of 14 values) corresponding to the first to twelfth (e.g., indices 0-12) and the fourteenth (e.g., index 13) columns.

The row/column selector 610 determines which line (i.e., row or column) to encode next based on a deterministic set of rules. As such, a decoder (such as the image decoder 616), using the same set of rules, can decode a line in same order as the encoding order of the image encoder 604. In an implementation, the rules include, as further describes with respect to FIG. 7: 1) select a line with the most extreme remaining probability, 2) in case of a tie (i.e., more than one line resulting in the most extreme remaining probability), select the line that pushes the remaining probability to be more extreme, and 3) in case of a tie (i.e., more than one line results in the most extreme remaining probability), select the line that leaves unchanged the greatest number of other extremes that are tied with the line. For example, if there are $M_e$ uncoded rows and $N_e$ uncoded columns that are tied (i.e., having the same extreme value) where $M_e > N_e$, then one of the $M_e$ uncoded rows is selected. In an implementation, the first of the $M_e$ rows is selected to be encoded. The remaining probability is the probability as described with respect to the base probability 808.

The entropy encoder 612 uses the probability values, as calculated and maintained by the probability module 608 for encoding lines of the current region into the compressed bitstream 614. In an implementation, the entropy encoder 612 can be, can be implemented by, or can be a component similar to the entropy encoding unit 440 of FIG. 4.

The image decoder 616 receives encoded occupancy information for a current region of an image in a compressed bitstream 614. Receiving the compressed bitstream 614 includes receiving the compressed bitstream 614 directly from the image encoder 604, retrieving a file that includes the compressed bitstream 614, or the like. The image decoder 616 can include a segmenting module 618, an entropy decoder 620, a probability module 622, and a row/column selector 624. In an implementation, the image decoder 616 does not include the segmenting module 618. The image decoder 616 decodes occupancy information for a current region of an image.

In a case where segmentation information is included in the bitstream 614 by the segmenting module 606, the segmenting module 618 decodes from the compressed bitstream 614, the segmentation information. The segmentation information includes how the current segment is split into sub-tiles and how each of the sub-tiles is further split into sub-tiles.

The image decoder 616 receives a count of vertices in the current region from the compressed bitstream. The image decoder 616 can also receive at least one of row sums and columns from the compressed bitstream. In an implementation, the entropy decoder 620 can be used to decode at least one of the count of vertices, the row sums, and the columns from the compressed bitstream. The entropy decoder 620 can also be used to decode lines (i.e., rows or columns) from the compressed bitstream 614. The entropy decoder 620 can use probability models maintained by the probability module 622. In an implementation, the entropy decoder 620 can be, can be implemented by, or can be a component similar to the entropy decoding unit 510 of FIG. 5. The probability module 622 can be as described with respect to the probability module 608.

The image decoder 616 decodes from the compressed bitstream one line (row or column) at a time. The row/column selector 624 can be used to determine which line is to be decoded next. The row/column selector 624 includes deterministic rules for selecting the next line to decode. The rules can be as described with respect to the row/column selector 610.

Figure 7:
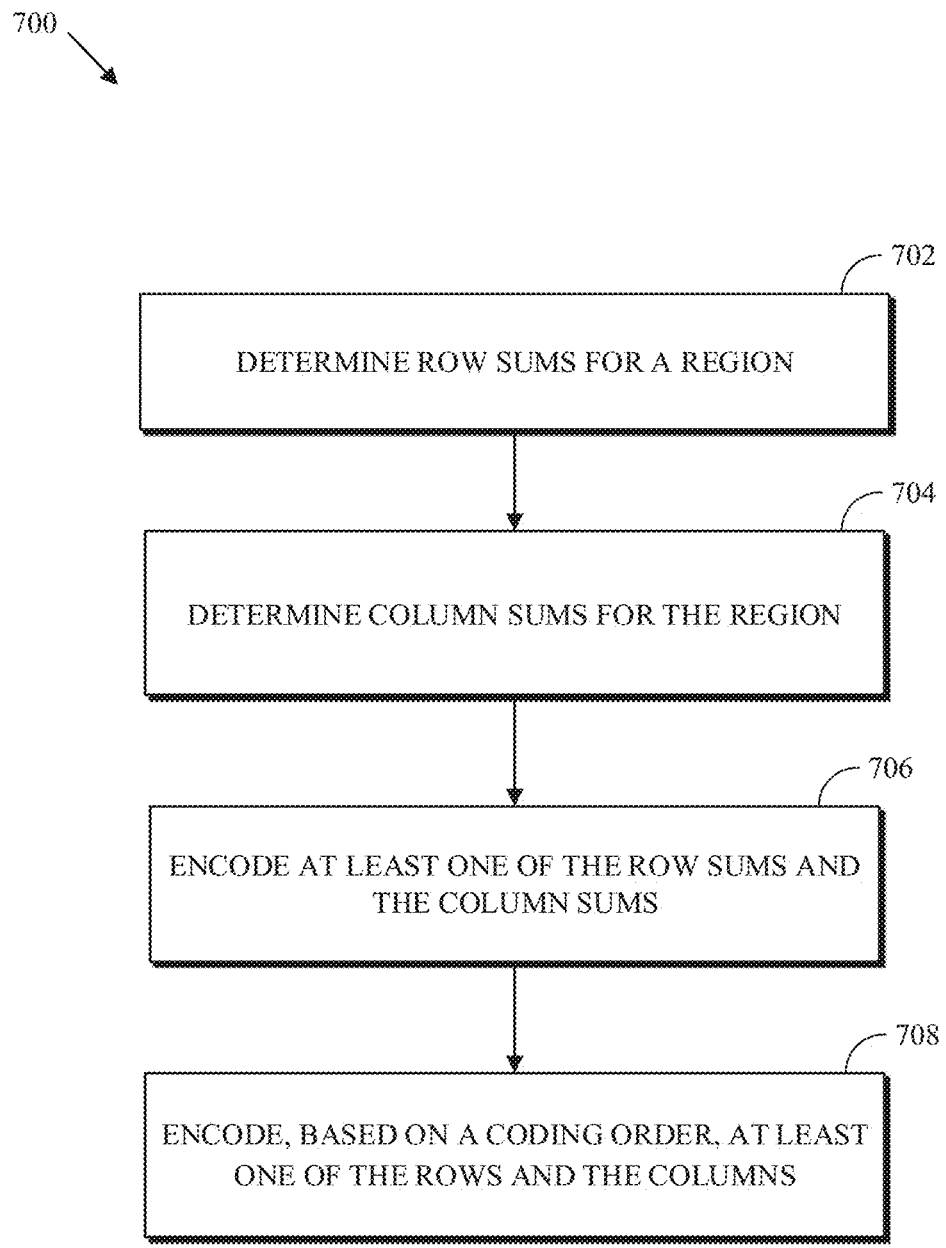
FIG. 7 is an example of a process for encoding occupancy information in a region of an image according to an implementation of this disclosure.

FIG. 7 is an example of a process 700 for encoding occupancy information in a region of an image according to an implementation of this disclosure. Occupancy information means the information indicating which grid location of the region are and/or which grid locations of the region are not vertices (i.e., occupied locations). The region can be a two-dimensional grid of rows and columns. The region includes occupancy information indicating which pixel locations (i.e., grid locations) of the image are marked as vertices. In an example, a vertex at a grid location is indicated by a value of 1 for that grid location and a non-vertex is indicated by a value of 0. In another example, a vertex can be indicated by a 0 and a non-vertex can be indicated by a 1. Other values for indicating a vertex and a non-vertex are possible. The region can be referred as an indicator grid. In an example, the region can be co-extensive with the image. In an example, the image may be partitioned into blocks and the region may be coextensive with a block of the blocks. A block can be rectangular or square. For example, a block can be 4×4, 4×16, 4×64, 8×8, 8×4, 8×57, 5×13, 4×16, 16×16, 32×32, 64×64, smaller or larger in size. In general, a block can be of any M×N size, where M and N are positive integers. The process 700 can be implemented by the computer system 110A of FIG. 1. The process 700 can be implemented by an image encoder, such as the image encoder 604 of FIG. 6.

At 702, the process 700 determines row sums for the region. For a row of the rows, the process 700 counts the respective number of occupied grid locations in that row. In an example, the process 700 determines a respective row sum for each of the rows of the region.

A specified value can indicate that a grid location is occupied. As such, for a row, the process 700 counts the number of row locations having the specified value. In a case where the specified value is 1, the count and the sum are equivalent. The row sums 810 of FIG. 8A illustrates an example of row sums. The row sums 810 indicates that the first row of the region 801 includes 8 occupied locations (i.e., vertices), the second row includes 7 occupied locations, the third row includes 4 occupied locations, and so on.

At 704, the process 700 determines column sums for the region. For a column of the columns, the process 700 counts the respective number of occupied grid locations in that column. In an example, the process 700 determines a respective column sum for each of the columns of the region. As indicated above, the specified value can indicate that a grid location is occupied. As such, for a column, the process 700 counts the number of column locations having the specified value. In a case where the specified value is 1, the count and the sum are equivalent. The column sums 812 of FIG. 8A illustrates an example of column sums. The column sums 812 indicates that the first column of the region 801 includes 3 occupied locations (i.e., vertices), the second column includes 4 occupied locations, the third column includes 6 occupied locations, and so on.

At 706, the process 700 encodes, in a compressed bitstream, such as the compressed bitstream 614 of FIG. 6, at least one of the row sums and the column sums. That is the process 700 encodes, in the encoded bitstream, the row sums, the column sums, or both the row sums and the column sums. In an implementation, encoding at least one of the row sums and the column sums includes determining, based on a cost of encoding the region, whether to encode the row sums, the column sums, or both the row sums and the column sums. That is, the process 700 can perform hypothetical encodings of the region using the row sums, column sums, and both the row sums and the column sums to determine which of the encodings results in a smaller number of encoding bits.

A hypothetical encoding process is a process that carries out the coding steps but does not output bits into the compressed bitstream. Since the purpose is to estimate a bitrate (or a simply rate), a hypothetical encoding process may be regarded or called a rate estimation process. The hypothetical encoding process computes the number of bits required to encode the region. In an example, multiple hypothetical encoders can be available and executing in parallel. For example, a standard rate estimator for an arithmetic encoder can be available for use with each of the options: encoding using row sums, encoding using column sums, and encoding using both row sums and column sums. Each rate estimator can provide (or, can be used to provide) an estimate of the number of bits that may be produced by the encoder for encoding the region.

For each option, the bits required to encode the respective sums (e.g., the row sums, the column sums, both the row sums and column sums) is added to the number of bits generated using the hypothetical encoding to determine a maximum number of bits for that option. The option that results in the smaller number of bits is the selected by the process 700. The process 700 can signal, in the compressed bitstream, the option selected.

In an implementation, encoding at least one of the row sums and the column sums can include encoding neither of the row sums and the column sums. As such, the process 700 can also use a hypothetical encoder to encode the region using progressive arithmetic coding as another option. A bit rate for coding the region using the progressive arithmetic coding option is also determined and compared to the total bitrates of the other options.

In an implementation, only a subset of the row sums and/or the column sums (whichever is encoded) are encoded. For example, sums of lines (i.e., rows and/or columns) whose probabilities are similar to the base probability 808 are not encoded. As indicated above, the base probability is 0.35. As such, each line of the region 801 is expected to include 14*0.35=5 expected vertices. In an implementation, a line having a sum that is within a threshold of the expected vertices is not encoded. The threshold can be 0, 1, 2, 3 or more vertices. For example, in a case that the threshold is 2, the any line whose sum is 5±2 (i.e., [3, 7]) is not encoded. In the case where only a subset of the row sums and/or column sums is encoded, the encoder indicates in the bitstream the lines whose sums are encoded.

In an implementation, entropy coding can be used to code the sums selected for encoding (i.e., the row sums, the column sums, or both the row sums and the column sums). Using the column sums 812 of FIG. 8A as an example, the process 700 can use, for each column sum, the maximum number of possible occupied locations for the column and the number of remaining un-encoded occupied locations. For example, to code the first column sum (i.e., 3) of the first column, the probability of 14/69 is used. The 14 corresponds to the maximum possible occupied locations in the first column and 69 corresponds to the total number of occupied locations. To code the second column sum (i.e., 4) of the second column, the probability 14/(69−3=66) can be used; to code the third column sum (i.e., 6) of the third column, the probability 14/(66−7=59) can be used; and so on. These distributions can be inferred in the encoder and the decoder. The distributions can be inferred by the decoder in cases where, as described above, the encoder sends or the decoder knows the count of occupied grid points.

In an implementation, encoding at least one of the row sums includes encoding locations (i.e., lines) that are above an expected threshold and encoding differences between the expected threshold and the respective sum.

Using the rows of the diagram 800 of FIG. 8 as an example, as there are a total of 69 vertices in the region 801, the expected number of vertices per row is 69/14=5 vertices. The expected threshold can be set to the expected number of vertices+a value X, where X=0, 1, 2, or other values. For example, using X=1, then the expected threshold is 5+1=6. As such, the process 700 can encode (and correspondingly, a decoder can decode) which lines (i.e., rows in this example) have sums that are above the expected threshold and differentially code the sums of those rows. As such, the encoder can encode the indices corresponding to the rows that have sums that are greater than or equal to 6, namely rows 0, 1, 4, 7, and 11, corresponding, respectively, to the sums 8, 7, 10, 9, and 8. The differentially encodes the row sums. That is the encoder encodes the difference between the row sums and the expected threshold. Specifically, the encoder encodes the value 2 (i.e., 8−6), 1 (i.e., 7−6), 4 (i.e., 10−6), and 2 (i.e., 8−6). Note that a decoder reverses the process by decoding the lines indexes, decoding the differences, and adding the differences to the expected threshold. In an example, the expected threshold can be encoded by encoder. In another example, the encoder and the decoder can be configured with the value X.

At 708, the process 700 encodes in the compressed bitstream at least one of the rows and the columns of the region. That is, if the row sums are encoded at 706, then the process 700 encodes the rows in the compressed bitstream; if the column sums are encoded at 706, then the process 700 encodes the columns; and if the row sums and the column sums are encoded at 706, then the process 700 can encode the rows and the columns. In the case where no row or column sums are encoded, then the process 700 (and a corresponding decoding process) can be configured to encode either the rows or the columns. Encoding a row (or column) means to encode in the compressed bitstream whether each grid location of the row (or column) is occupied (i.e., is a vertex). Each of the values of a row or column can be encoded using a probability model as described below.

The process 700 encodes the rows and/or columns in a coding order that is based on the row sums and/or the column sums, depending on which is/are encoded at 706. The coding order is used to select which row and/or column to encode next. For example, and in the case of coding the rows, the process 700 may not necessarily encode the rows in the order: row 0, row 1, row 2, . . . , row N−1, where N is the number of rows in the region. Rather, the process 700 selects a next row or column to encode based on a set of rules that make use of the most constraining probabilities so that encoding subsequent rows or columns are even more constrained.

Most constraining probability means a probability value that is as close to one or zero as the current statistics indicate. As the best compression performance is achieved when the entropy of "occupied" (e.g., grid location value equals 1) vs. "not occupied" (e.g., grid location value equals 0) is low, the most constraining probability is used to select the next row or column to encode. The most constraining probability corresponds to the most unbalanced row/column. That is, the most constraining probability corresponds to the row or column containing the most of either 0 or 1 values.

As a decoder can be configured to decode rows or columns for the compressed bitstream using the same rules as those used by the process 700 to encode rows or columns, the process 700 need not signal in the compressed bitstream which row or column is being encoded next. A decoder can update the received row sums and/or column sums as rows and/or columns are decoded.

Encoding rows and/or columns based on the coding order is now illustrated with reference to FIGS. 8A-8F. FIGS. 8A-8F are diagrams of an example of compression of occupancy or indicator grids according to implementations of this disclosure. The illustrated example uses both row sums and column sums. However, using only the row sums or only columns operate similarly.

The process 700 can first determine the base probability 808. The base probability 808 is calculated as base=(number of vertices in the region)/(total number of grid points in the region). In the example of FIG. 8A, the base probability 808 is 0.35 (i.e., 69/196).

In an implementation, the process 700 selects a next row or column to encode. The next row or column to encode corresponds to the most extreme statistic (equivalently, the most extreme probability or sum). That is, the process 700 uses the most extreme statistics first. The most extreme statistics (e.g., current row or column sums) correspond to the column 814, which includes 12 vertices (i.e., probability of 12/14=0.86), and a row 816, which includes 2 vertices (i.e., a probability of 2/14=0.14).

The statistics of the column 814 and the row 816 are considered equivalent. Two statistics, s1 of line 1 and s2 or line 2, are considered equivalent when s1=s2 or s1+s2=N, where N is the number grid locations in each line. Equivalently, two probabilities, p1 of line 1 and p2 of line 2, are considered equivalent when p1=p2 or p1+p2=1. Accordingly, the column 814 and the row 816 are equivalent since 12+2=14 and, equivalently, 0.86+0.14=1.

As the column 814 and the row 816 are equivalent, the column 814 and the row 816 are tied for selection to be encoded next. In an implementation, and in the case of a tie, the process 700 can be configured to select a row over a column (e.g., the process 700 is biased toward selecting rows). Alternatively, the process 700 can be biased to select a column. In the case of tie that involves multiple rows (columns), the process 700 can be configured to select the row (column) with the lowest index (i.e., the row or column that is closest to the (0, 0) location of the region).

In another implementation, and in the case of a tie (i.e., there are equivalent rows or columns, or, equivalently, more than one row or column corresponds to the most extreme probability or statistic), the process 700 can select to encode the line (row or column) that results in the remaining probability becoming more extreme. That is, in a case where a first row or column (e.g., the column 814) and a second row or column (e.g., the row 816) are equivalent, the process 700 selects to encode the one of the first row or column and a second row or column resulting in the remaining probability being more extreme.

The "remaining probability" means, in this context, the value of the base probability; "becoming more extreme" means that the value of the base probability is pushed toward lower entropy for the remaining un-encoded region.

For example, if the base probability is >0.5, then the row or column that, after encoding the row or column, pushes the base probability closer to 1 is the row or column that is selected for encoding; and if the base probability is <0.5, then the row or column that pushes the base probability closer to 0 is the row or column selected for encoding. Said another way, if the base probability is >0.5, then the row or column that includes less occupied grid points (i.e., more zeros than ones) is selected; and if the base probability is <0.5, then the row or column that includes more occupied grid points (i.e., more ones than zeros) is selected.

For example, if the column 814 were encoded next, then the total remaining un-encoded grid locations becomes 196−14=182 and the total un-encoded vertices become 69−12=57. Accordingly, the remaining probability (i.e., the new value of the base probability 808) becomes 57/182=0.31. If, instead, the row 816 were encoded next, then the total remaining un-encoded grid locations becomes 196−14=182 and the total un-encoded vertices become 69−2=67. Accordingly, the remaining probability (i.e., the new value of the base probability 808) becomes 67/182=0.37. Accordingly, the process 700 selects the column 814 to encode next.

In an implementation, encoding the next row or column (e.g., the column 814) includes encoding the next row or column using progressive arithmetic coding. The diagram 840A of FIG. 8A illustrates using progressive arithmetic coding to encode the column 814. Illustrated in the diagram 840A is the column 814 and the progressive probabilities 819. The progressive probabilities 819 are used to entropy code the next grid location of the column 814.

The probability used for entropy coding each of the grid points of the row or column is given by: p=(number of remaining unencoded vertices)/(number of remaining unencoded grid location). As such, the probability used for encoding (i.e., entropy coding) the grid location 818 (i.e., the first grid location of column 814) is p=12/14=0.86. After coding the grid location 818, 12 vertices and 13 total grid locations remain to be coded. As such, the probability used for encoding the grid location 820, which is a vertex, is 12/13=0.92. After coding the grid location 820, 11 vertices and 12 total grid locations remain to be coded. As such, the probability used for encoding the grid location 822 is 11/12=0.92. And so on for the remaining grid locations of the column 814.

In another implementation, where the row sums and the column sums are known to a decoder (e.g., by being encoded at 706), the encoder can use both the row sums and the columns in coding a line of the region. That is, in the case of encoding a row, the process 700 can use the column sums to encode the row; and in the case of encoding a column, the process 700 can use the row sums to encode the column. Said another way, when coding a line (e.g., row or column) of the region, the process 700 uses the information provided by the orthogonal sums (e.g., column sums or row sums). Diagram 840B of FIG. 8A illustrates the use of row sums to encode the column 814. The row sums are the orthogonal sums of the column being encoded.

Illustrated in the diagram 840B are row probabilities 824, the progressive probabilities 819, and conditional probabilities 826. The conditional probabilities are used for entropy coding the grid locations of the column 814.

The row probabilities can be determined (e.g., generated, calculated, etc.) using the row sums. The row probability for a row is given by the number of un-encoded vertices in the row divided by the number of un-encoded grid locations of the row. As such, the probability 828 of the first row is 8/14=0.57, the probability 830 of the second row is 7/14=0.50, the probability 832 of the third row is 4/14=0.29, and so on.

The conditional probabilities 826 combine the row probabilities 824 and the progressive probabilities 819. The row probabilities 824 and the progressive probabilities 819 can be combined by computing modified (i.e., un-normalized) probabilities. The progressive column probability for a 1 value (i.e., a vertex) is multiplied by the current row probability divided by the average probabilities of 1 across the remaining row; and the progressive column probability for a 0 value (i.e., a non-vertex) is multiplied by the current row probability divided by the average probabilities of 0 across the remaining row. The two calculated values are then re-normalized so that they can be used as probabilities. Equations 3-5 summarize the calculation steps:

$$P'(1) = \frac{\text{progressive probability} * \text{row probability}}{\text{base probability}} \quad (3)$$

$$P'(0) = \frac{(1 - \text{progressive probability}) * (1 - \text{row probability})}{(1 - \text{base probability})} \quad (4)$$

-continued $$P(1) = \frac{P'(1)}{P'(1)+P'(0)} \quad P(0) = \frac{P'(0)}{P'(1)+P'(0)} \quad (5)$$

Using equations 3-5, the conditional probability 834 can be calculated as P'(1)=0.86*0.57/0.35=1.4, P'(0)=(1−0.86)*(1−0.57)/(1−0.35)=0.09, and P(1)=1.4/(1.4+0.09)=0.94; the conditional probability 836 can be calculated as P'(1)=0.92*0.5/0.35=1.31, P'(0)=(1−0.92)*(1−0.5)/(1−0.35)=0.06, and P(1)=1.31/(1.31+0.06)=0.96; the conditional probability 838 can be calculated as P'(1)=0.91*0.29/0.35=0.75, P'(0)=(1−0.91)*(1−0.29)/(1−0.35)=0.1, and P(1)=0.75/(0.75+0.1)=0.9; and so on. The process 700 can use the conditional probabilities 826 for entropy coding the occupancy information (i.e., 1 and 0 values) of the column 814.

Using the conditional probability 834 as an example, the calculations above can be summarized as follows: based on the column sums, there is an 86% chance (i.e., probability of 0.86) of having a 1 value in the first gird location of the column 814; over all the rows, there is a 35% change (i.e., the base probability 808 of 0.35) of having a 1 at any one grid location, and for the particular row that includes the first grid location of the column 814, there is a 57% chance (i.e., the probability 828) that the first grid location of the column 814 is a 1. The aforementioned probabilities are combined to determine a new ratio for the probability of a 1 value at the grid location being encoded. The ratio is converted to a probability by normalizing the ratio for a 1 value (i.e., vertex) and the ratio of a 0 value (i.e., a non-vertex).

In some implementations, the process 700 can determine whether to encode the next row or column using progressive arithmetic coding or using conditional probabilities as described above. For example, the process 700 can perform hypothetical encodings using progressive arithmetic coding and using conditional probabilities and selecting the one that results in the least amount of bits. The process 700 signals, in the compressed bitstream, which encoding is used for the next row or column. That is, the process 700 can signal, for a row, whether a decoding process is to use the column sums or not; and the process 700 can signal, for a column, whether the decoding process is to use the row sums or not.

Figure 8B:
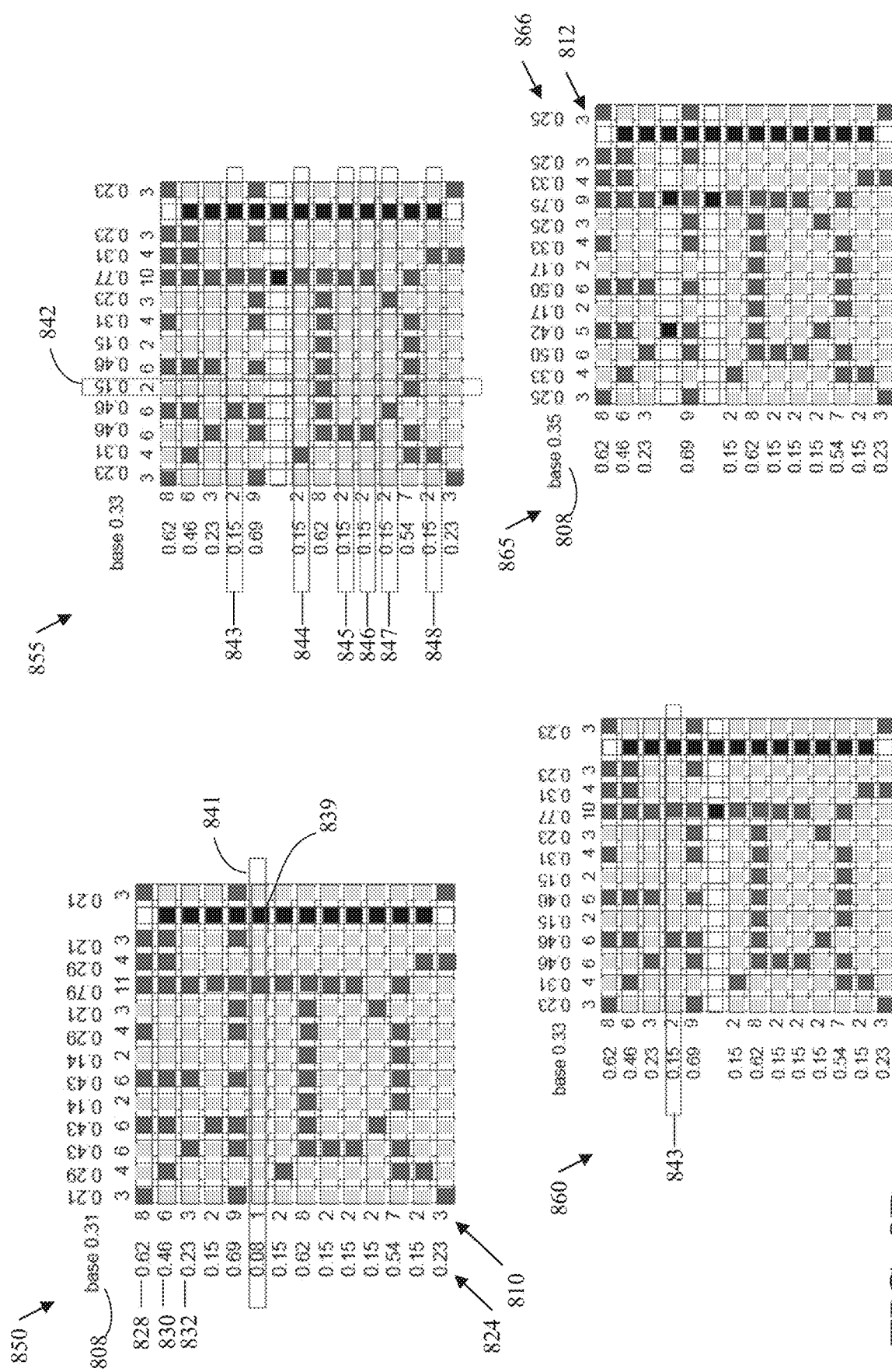

Diagram 850 of FIG. 8B illustrates that the column 814 has been encoded. Encoded vertices are illustrated as black-colored cells and encoded non-vertices are illustrated as white-colored cells. After encoding a line, the base probability, the orthogonal sums, and the orthogonal probabilities can be recalculated to reflect the current statistics (i.e., the current remaining information). In the example, the encoded line is the column 814, the orthogonal sums are the row sums 810, and the orthogonal probabilities are row probabilities 824. Alternatively, the orthogonal sums and the orthogonal probabilities can be recalculated after encoding a grid position. For example, after encoding the first grid position of the column 814, the row sum for the first row can adjusted to reflect whether the encoded grid position is occupied or not. For example, the adjusted row sum for the first row can be calculated as row sum minus grid position value=8−0=8; the adjusted row sum for the second row can be calculated as 8−1=7; and so on. Using the adjusted row sums, the row probabilities 824 can be recalculated. For example, the probability 828 can be recalculated as 8/13=0.62, the probability 830 can be recalculated as 7/13=0.46; the probability 832 can be recalculated as 3/13=0.23; and so on. The base probability 808 can be recalculated as (69−12)/(196−14)= 0.31, where (69−12) is the number of remaining un-encoded vertices (since 12 vertices were encoded for the column 814) and (196−14) is the number of remaining un-encoded grid locations (since the column 814 includes 14 grid locations).

As illustrated in the diagram 850, the new value of the base probability 808 is 0.31 (as described above). The new value of the probability 828 is 8/13=0.62; the new value of the probability 830 is 6/13=0.46; the new value of the probability 832 is 3/13=0.23; and so on.

As described above, the process 700 then selects to encode a next row or column that corresponds to the most extreme statistic. As depicted in the diagram 850, the row 841 (i.e., row sum=1) corresponds to the most extreme statistic. It is noted that, while the row 841 includes 2 vertices, one of the vertices is encoded as part of encoding the column 814. Accordingly, the row sum of the row 841 is 1.

The row 841 is encoded as described above and the base probability, the orthogonal sums (in this case, the column sums), and the orthogonal probabilities (in this case, the row probabilities) are adjusted based on the remaining statistics of the un-encoded portions of the region 801. Diagram 855 of FIG. 8B illustrates the recalculated values of the base probability 808 (i.e., (57−1)/(182−13)=0.33), the column sums and the column probabilities.

Again, the process 700 then selects to encode a next row or column that corresponds to the most extreme statistic. As illustrated in the diagram 855, column 842 and rows 843-848 are tied for the most extreme probability or statistic (i.e., row sum=2; row probability=0.15). As described above, the process 700 can select to encode the line (row or column) that results in the remaining probability (i.e., base probability) becoming more extreme.

If any of the column 842 or rows 843-848 is encoded next, then the recalculated value of the base probability 808 becomes 54/157=0.34. As such, no one line (row or column) pushes the base probability to a more extreme value than the other lines and the rows and columns are tied for the most extreme remaining probability. In such a case, an implementation of the process 700 can select to encode the one of the first row or column (the column 842 or rows 843-848) that leaves the other extremes least changed. That is, the process 700 selects the one row or column that leaves the most extremes in the remaining rows and columns.

If the process 700 selects the column 842 to encode, then the recalculated row sums of the rows 843-848 become 2/12=0.17, where 2 corresponds to the number of un-encoded vertices in each row and the 12 corresponds to the number of un-encoded grid locations in each row. As such, by selecting the column 842, the probabilities of the 6 rows (i.e. the rows 843-848) are changed to become less extreme. On the other hand, if the process 700 selects one of the rows 843-848 to encode, then the row probabilities of the other rows remain at the extreme (i.e., 0.15) while only one probability, namely that of the column 842, become less extreme; that is, the column probability of the column 842 become 0.17. As such, the process 700 selects one of the rows 843-848 to encode next. The process 700 can be configured to select the line having the smallest index. That is, in this case, the process 700 selects the row 843 to encode next.

In an implementations, if an M number of rows (or columns) and an N number of columns (or rows) are tied, where M<N, then the process 700 can select one of the N columns (or rows) to encode next. In the example above, 1 (i.e., M=1) column and 6 (i.e., N=6) rows are tied. As such, the process 700 can select one of the 6 rows to encode next.

As indicated above, in an implementation, in the case of a tie, the process 700 selects the row or column with the lowest index. In another implementation, the process 700 can signal, in the compressed bitstream, which row is encoded next. For example, if the process 700 is not configured to select a specific row, then the process 700 can signal the index, among the tied rows, of the row to be encoded. For example, the process 700 can signal one of the indices 0, 1, . . . , 5 corresponding, respectively, to the rows 843-848. As a decoder has the same row and/or column sums and row and/or column probabilities, the decoder can unambiguously determine which specific absolute row the signaled row index refers to. For example, if the process 700 encodes the index 4, then a decoder can unambiguously determine that the row 847 is the referenced row.

Diagram 860 of FIG. 8B indicates that the row 843 is selected to be encoded next. Diagram 865 of FIG. 8B illustrates the updated values of the base probability 808, the column sums 812, and the column probabilities 866 after the row 843 has been encoded. Diagram 870 of FIG. 8C illustrates that the process 700 has encoded, in sequence, the rows 844, 845, 846, 847, and 848 and the resulting updated values of the base probability 808, the column sums 812, and the column probabilities 866.

Figure 8C:
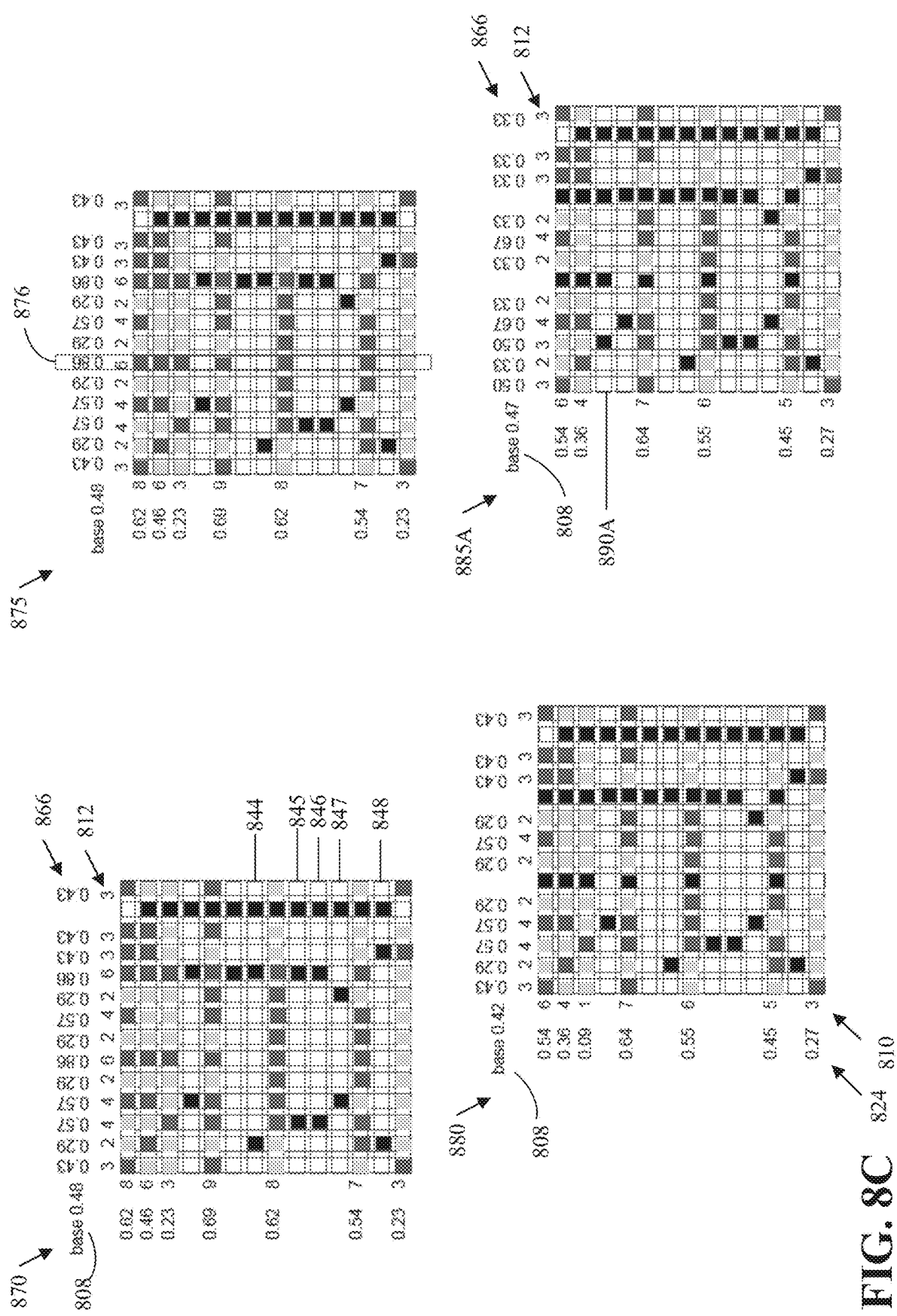

In FIG. 8C, diagram 875 illustrates that column 876 is the next row or column corresponding to a most extreme probability (i.e., column probability=0.86). As such, the process 700 encodes the column 876 as described above. Diagram 880 illustrates the updated values of the base probability 808, the row sums 810, and the row probabilities 824 after the column 876 has been encoded. Diagram 885A illustrates that row 890A is encoded next and the updated values of the base probability 808, the column sums 812, and the column probabilities 866.

Figure 8D:
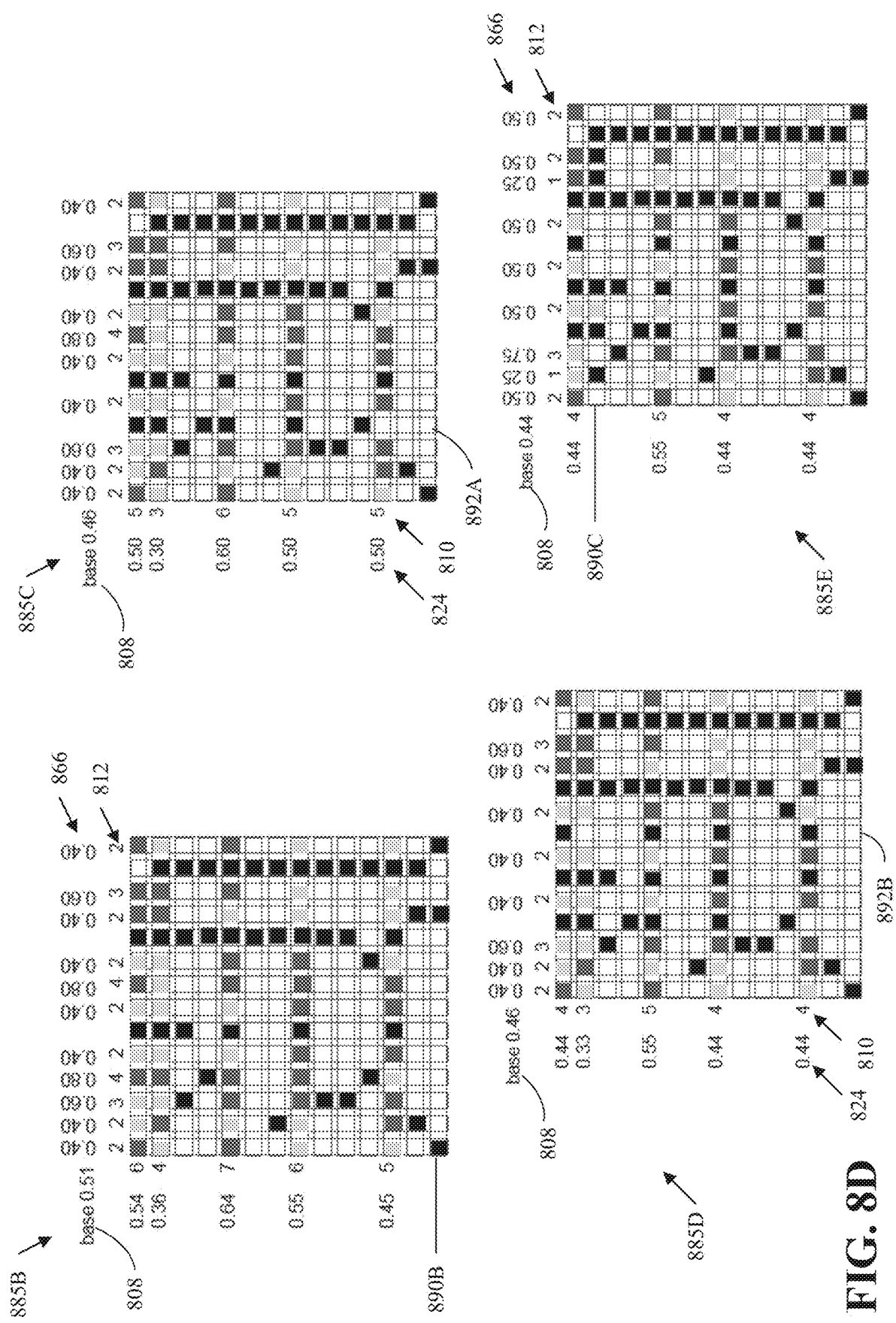

In FIG. 8D, diagram 885B illustrates that row 890B is encoded next and the updated values of the base probability 808, the column sums 812, and the column probabilities 866. Diagram 885C illustrates that column 892A is encoded next and the updated values of the base probability 808, the row sums 810, and the row probabilities 824. Diagram 885D illustrates that column 892B is encoded next and the updated values of the base probability 808, the row sums 810, and the row probabilities 824. Diagram 885E illustrates that row 890C is encoded next and the updated values of the base probability 808, the column sums 812, and the column probabilities 866.

Figure 8E:
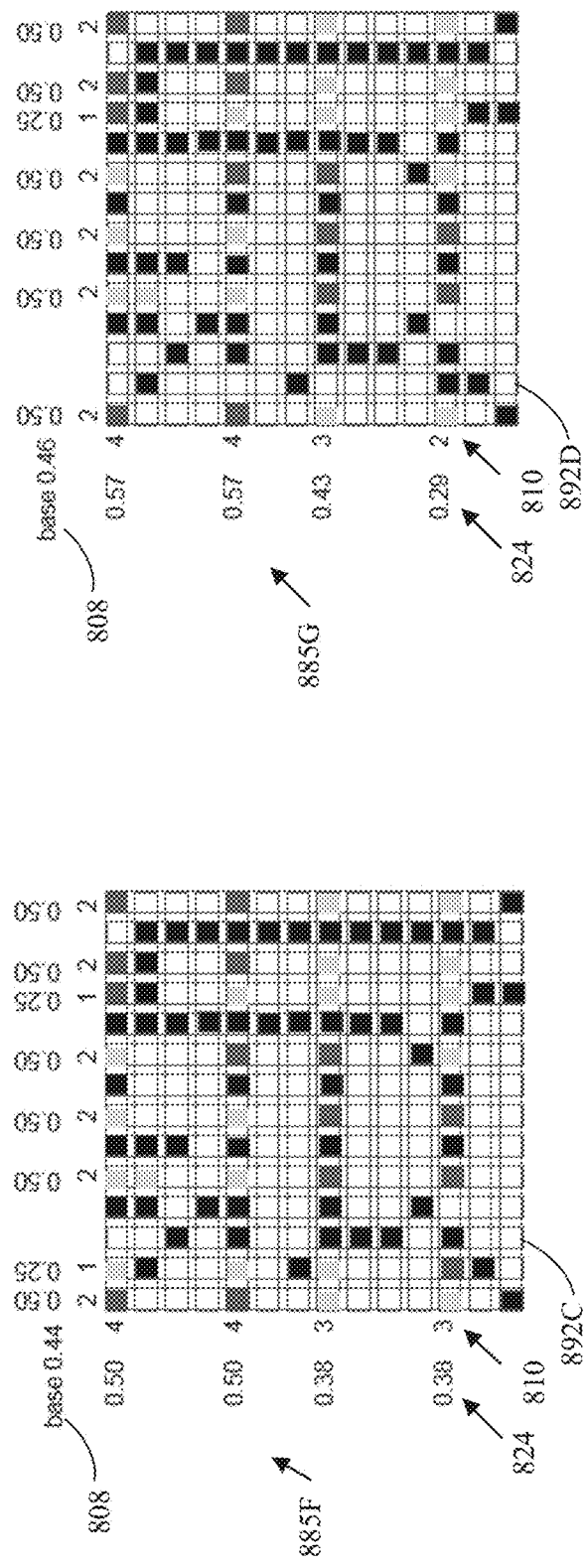
Figure 8E:
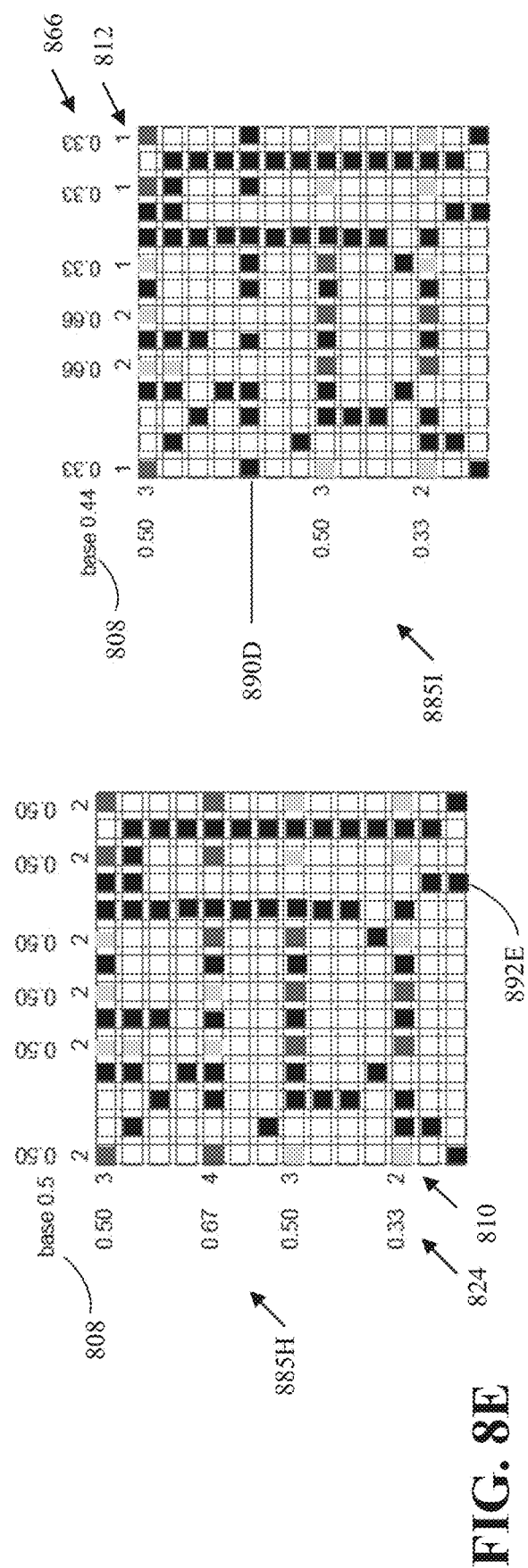

In FIG. 8E, diagram 885F illustrates that column 892C is encoded next and the updated values of the base probability 808, the row sums 810, and the row probabilities 824. Diagram 885G illustrates that column 892D is encoded next and the updated values of the base probability 808, the row sums 810, and the row probabilities 824. Diagram 885H illustrates that column 892E is encoded next and the updated values of the base probability 808, the row sums 810, and the row probabilities 824. Diagram 885I illustrates that row 890D is encoded next and the updated values of the base probability 808, the column sums 812, and the column probabilities 866.

Figure 8F:
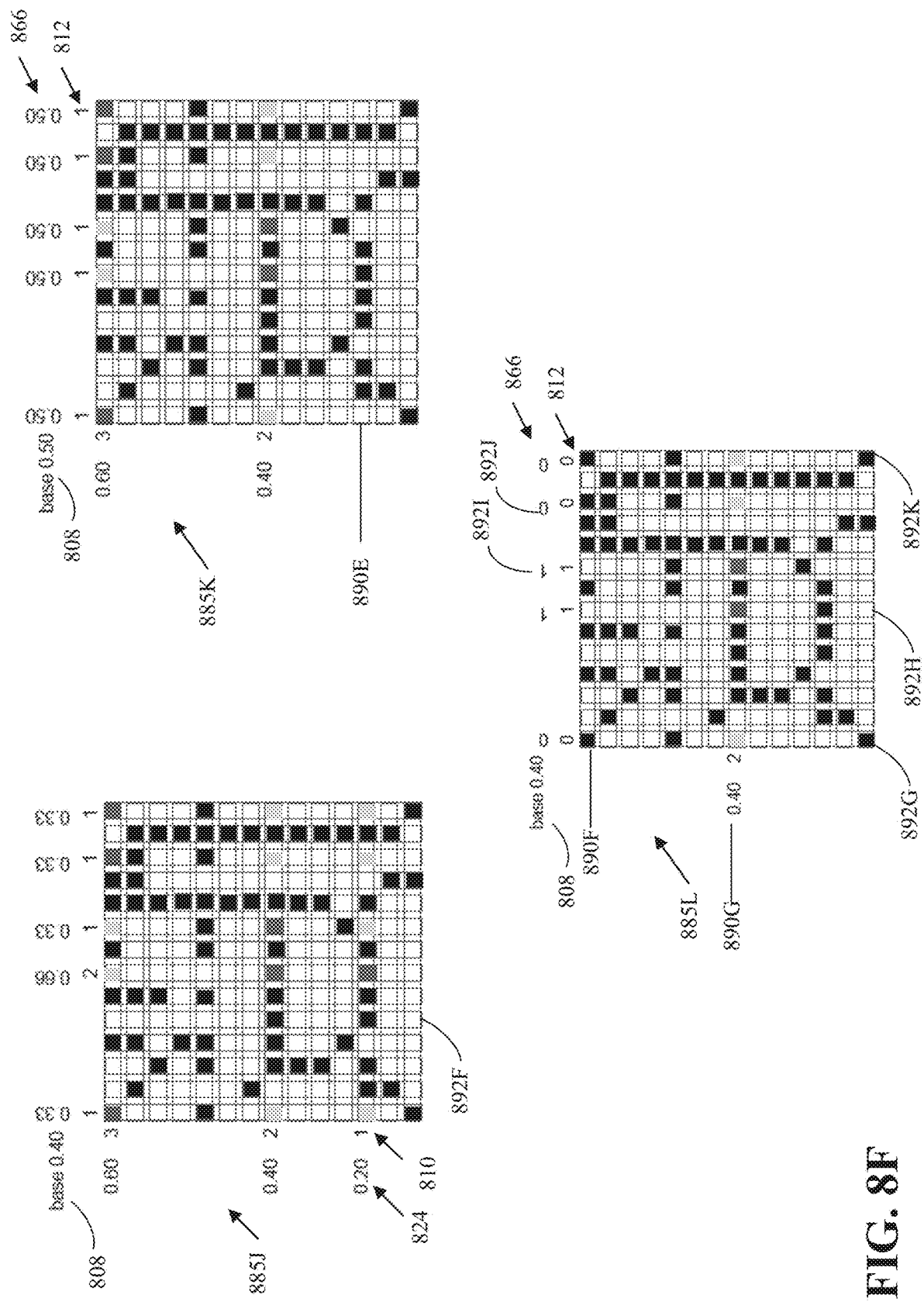

In FIG. 8F, diagram 885J illustrates that column 892F is encoded next and the updated values of the base probability 808, the row sums 810, and the row probabilities 824. Diagram 885K illustrates that row 890E is encoded next and the updated values of the base probability 808, the column sums 812, and the column probabilities 866. Diagram 885L illustrates that row 890F is encoded next and the updated values of the base probability 808, the column sums 812, and the column probabilities 866.

After the row 890F is encoded, five grid locations of the region 801 remain un-encoded. The five grid location are in row 890G. The five grid locations include 2 vertices (i.e., occupied grid locations) and 3 non-vertices. The five grid locations are located as follows: one non-vertex in column 892G, one vertex in column 892H, one vertex in column 892I, one non-vertex in column 892J, and one non-vertex in column 892J. The process 700 need not encode any more information to enable a decoder to determine (e.g., decode) the values of the remaining un-coded grid locations.

When the probability of a line (e.g., row or column) is 1, a decoder can infer that all remaining (i.e., un-decoded) grid locations of the line are vertices. When the probability of a line (e.g., row or column) is 0, the decoder can infer that all remaining (i.e., un-decoded) grid locations of the line are non-vertices. As such, the decoder can infer that the remaining locations of the columns 892G, 892J, 892K are non-vertices (i.e., have values of zero). Similarly, the decoder can infer that the remaining locations of the columns 892H, 892I are vertices (i.e., have values of one).

In an implementation, the process 700 can include splitting the image into sub-tiles. Splitting the image into sub-tiles includes splitting each sub-tile into further sub-tiles. The region of the image can be one of the sub-tiles. The sub-tiles are such that each sub-tile is composed mostly of zeros (i.e., non-vertices) or mostly of ones (i.e., vertices). That is, the image is split into sub-tiles based on spatial correlation. The image is split into sub-tiles such that each sub-tile, or the collection of the sub-tiles as a whole, have extreme statistics.

That a sub-tile includes mostly vertices or non-vertices means that the entropy of the sub-tile is low which, in turn, means that fewer bits are required to encode the state of the sub-tile in a compressed bitstream. The state of the sub-tile can refer to the row sums and/or column sums of the sub-tile. The lower the entropy of a sub-tile, the more vertices and non-vertices that a decoder can infer. As such, decoding a first sub-tile can take less time than decoding a second sub-tile of higher entropy.

Figure 9:
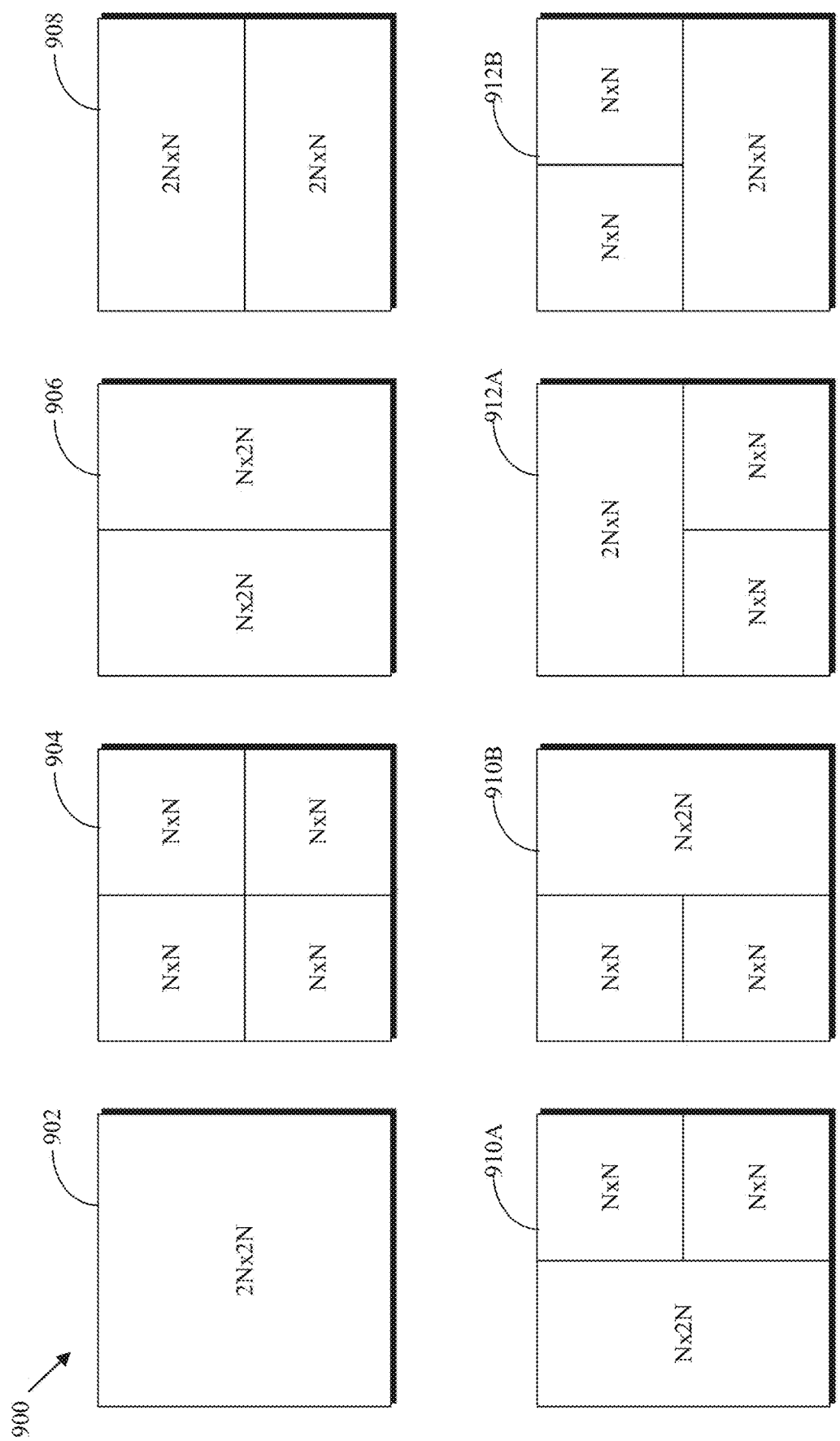
FIG. 9 is a diagram of sub-divisions of an image of size 2N×2N according to implementations of this disclosure.

In an implementation, starting at the image level, the process 700 can select a sub-division from a set of possible sub-divisions. In an example, six sub-divisions are possible. FIG. 9 is a diagram of sub-divisions 900 of an image of size 2N×2N according to implementations of this disclosure. Sub-division 902 is a no sub-division. That is the sub-tile and the region are co-extensive with the image itself. That is, the sub-tile is of size 2N×2N. Sub-division 904 splits the image into four equal square quadrants, each of size N×N. Sub-division 906 is a vertical-only sub-division, which results in two rectangular sub-tiles of size N×2N. Sub-division 908 is a horizontal-only sub-division, which results in two rectangular sub-tiles of size 2N×N. Sub-division 910A is a vertical+half-horizontal subdivision, which results in one rectangular sub-tile of size N×2N and two square sub-tiles each of size N×N. Sub-division 912A is a horizontal+half-vertical subdivision, which results in one rectangular sub-tile of size 2N×N and two square sub-tiles each of size N×N.

In an implementation, sub-divisions 910B, 912B are also available. The sub-division 910B is a half-horizontal+vertical subdivision, which results in two square sub-tiles each of size N×N and one rectangular sub-tile of size N×2N. The sub-division 912B is a half-vertical+horizontal sub-division, which results in two square sub-tiles each of size N×N and one rectangular sub-tile of size 2N×N. Other sub-divisions are also possible.

Each of the sub-tiles can be further split into additional sub-tiles using the set of possible sub-divisions. In an implementation, only square sub-tiles can be split into further sub-tiles. That is, rectangular sub-tiles are not split further. As such, the process 700 can perform a hierarchical splitting of the square tiles.

The process 700 can determine, based on one or more decision criteria, whether a square sub-tile is to be further split. The process 700 can use dynamic programming to determine which sub-division (i.e., which of the sub-divisions 902-912) is best. The best sub-division is the sub-division that results in the smallest total number of bits required to communicate to a decoding process. As such, the decision criteria that can be used in the dynamic programming process include the total number of bits required to communicate (e.g., encode) the actual occupancy image.

The total number of bits includes the bits required to communicate 1) the sub-division, 2) each sub-tile occupancy count (i.e., the number of vertices in each sub-tile of the sub-division), and 3) the bits needed for the disambiguation of each sub-tile.

The sub-division can be communicated (e.g., encoded) using a quadtree-like encoding scheme. For example, each sub-division 902-912 can be associated with an index. For example, the sub-divisions 902, 904, and 910A may be associated, respectively, with the indices 0, 1, and 4, and assuming that the sub-tiles are encoded in a raster scan order, then the process 700 can encode the indices 10700 for the sub-division 1000 as further described below with respect to FIG. 10. Other encodings are possible.

The bits needed for disambiguation are the bits required by a decoding process to reconstruct (i.e., determine which gird locations are vertices and which are not vertices) the sub-tile. The number of bits required for disambiguation depends on the whether row sums, column sums, or both row sums and column sums are encoded for the sub-tile.

In an implementation, the number of bits needed for disambiguation can be estimated using progressive arithmetic coding as described above. That is, instead of performing hypothetical encodings using the row sums, the column sums, and both the row sums and the column sums, the number of bits needed for disambiguation is estimated using only the progressive arithmetic coding option.

Figure 10:
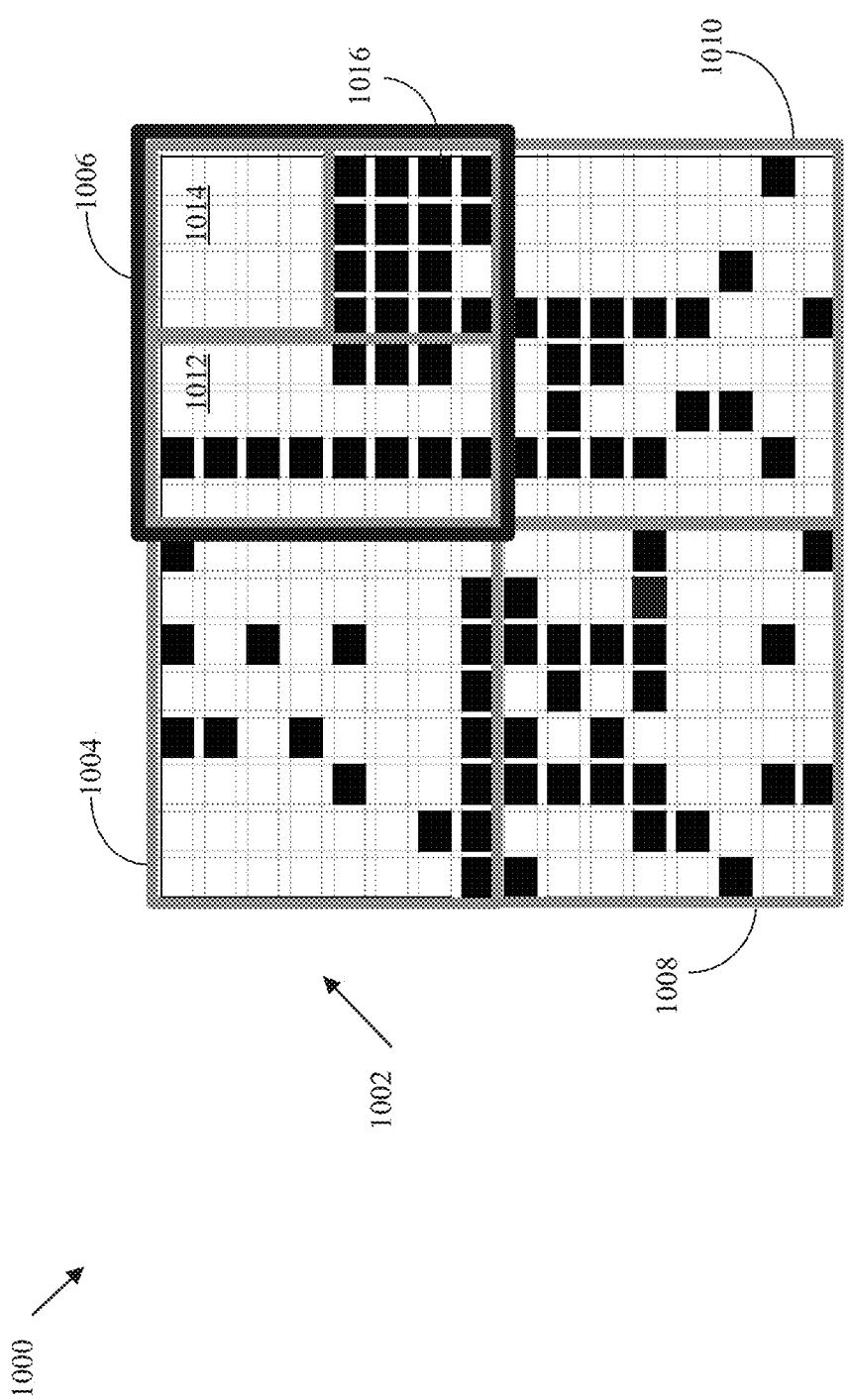
FIG. 10 illustrates a sub-division of the region of FIG. 8A into sub-tiles according to implementations of this disclosure.

FIG. 10 illustrates a sub-division 1000 of a region into sub-tiles according to implementations of this disclosure. In the illustration of FIG. 10, the region 1002 is a 16×16 region. However, the region can be of any size. The region 1002 is first split, using the sub-division 904 of FIG. 9, into four square sub-tiles, namely sub-tile 1004, 1006, 1008, and 1010. The sub-tile 1006 is further split, using the sub-division 910A, into one rectangular (i.e., sub-tile 1012) and two square (i.e., sub-tiles 1014, 1016) sub-tiles.

The sub-tile 1014 includes no vertices. As such, the sub-tile 1014 is considered to have an extreme probability: the probability of a grid location having a value of zero is 1. As such, the process 700 need only encode a 0 value (corresponding to the count of the number of occupied grid points) for the sub-tile 1014. A decoder (such as the image decoder 616 of FIG. 6) or a decoding process (such as a decoding process implemented by the image decoder 616) can infer the value (i.e., 0) of the 16 grid points of the sub-tile 1014 based on the count. The sub-tile 1016 also considered to have an extreme probability since the probability of a grid point being a vertex is 15/16=0.94.

In an implementation, and in the case where the dimensions of the image are not powers of two, splitting the image into sub-tiles can include splitting the image into sub-tiles of different sizes. In an example, the image can be split into sub-tiles in such a way that each of the sub-tiles is as close to a square as the dimensions of the image permit. For example, if the image size is 201×503, the first division can include splitting the 503 rows into two sub-tiles, a top sub-tile of size 201×252 and a bottom sub-tile of size 201×251.

A sub-tile (i.e., an image or a sub-tile) can be treated as "almost square." An almost-square sub-tile can be further split in either of the vertical or the horizontal directions without splitting the sub-tile in the other direction. In an implementation, a sub-tile of size M×N (or N×M), where M<N, is an "almost square" sub-tile when (M−N)/M is less than a predetermined percentage. The predetermined percentage can be 10%, 15%, or any other value that is less than 50%.

A sub-tile can be treated as a "nearly 2:1 (or 1:2) rectangular sub-tile." Such a sub-tile can only be split into "almost square" sub-tiles by dividing the longest dimension of the sub-tile. For example, given a sub-tile of size M×(2M+m), where M is a positive integer and m is a positive or negative number that is significantly smaller than M, then the sub-tile can be divided into two sub-tiles, each of size approximately equal to M×((2M+m)/2). A sub-tile that is more oblong than a 1.5:1 (or 1:1.5) ratio can be treated as a "nearly 2:1 (or 1:2) rectangular" sub-tile. "A sub-tile that is more oblong than a 1.5:1 (or 1:1.5) ratio" means that if the sub-tile is of size M×N (N×M), where M>N, then M and N are such that M/N>1.5. An M×N (N×M) sub-tile, where M>N, that is "1.5:1 (or 1:1.5) ratio" oblong or less (i.e., M/N≤1.5), can be treated as an "almost square" sub-tile.

Figure 11:
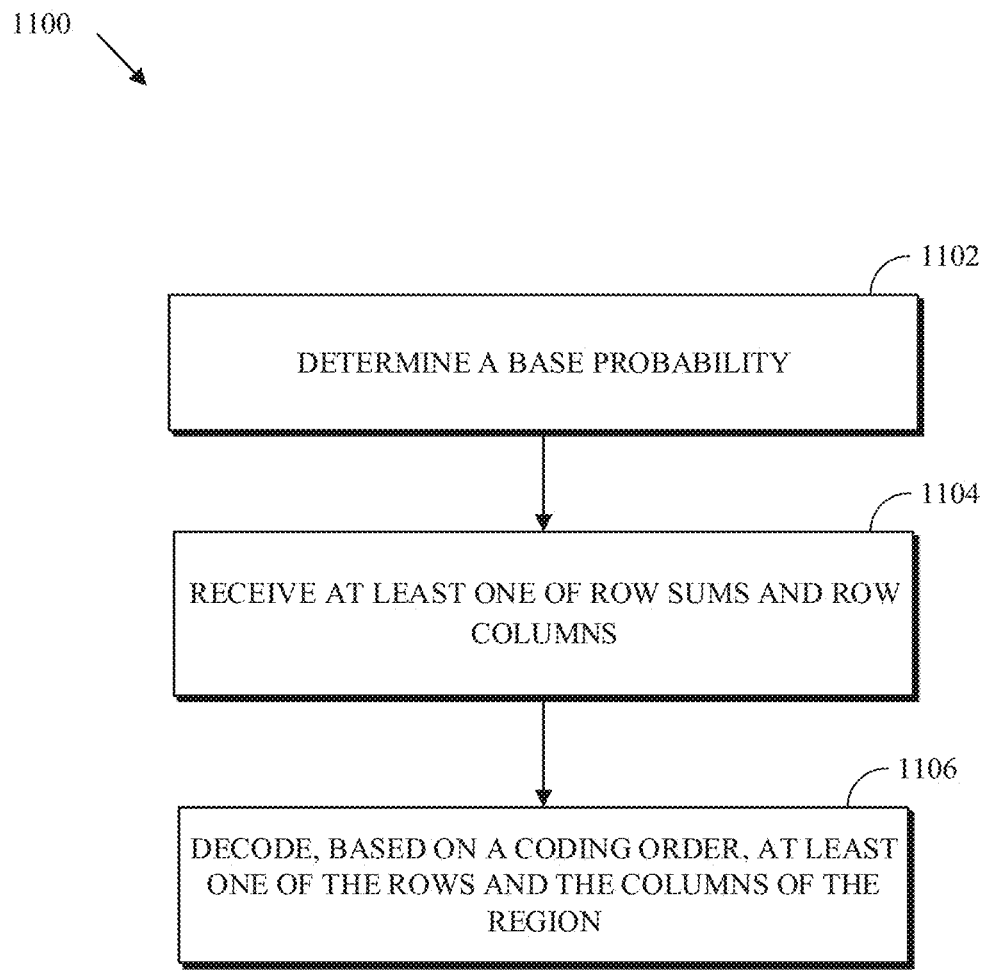
FIG. 11 is an example of a process for decoding occupancy information in a region of an image according to an implementation of this disclosure.

FIG. 11 is an example of a process 1100 for decoding occupancy information in a region of an image according to an implementation of this disclosure. The process 1100 can be implemented by an image decoder, such as the image decoder 616 of FIG. 6. The process 1100 decodes, from a compressed bitstream, such as the compressed bitstream 614 of FIG. 6, a region of an image to determine occupancy information. The region is two-dimensional consisting of N rows and M column, where N and M are positive numbers. As such, the region includes N×M grid locations. Occupancy information indicates, for the region which grid locations are vertices and which grid locations are non-vertices. The vertices may be indicated with values of 1 and non-vertices may be indicated with values of 0. Other values are possible for the occupancy information.

At 1102, the process 1100 determines a base probability. The base probability is the probability of a grid location being a vertices. That is the base probability is the probability that a grid location has a specified value. For example, if the value 1 is indicative of a vertex, then the base probability is the probability that a grid location has a value of 1. In an implementation, the process 1100 can determine the base probability by decoding a count of vertices in the region from the compressed bitstream and dividing the count by the number of grid locations in the region. In another implementation, and as described above, the count of vertices in the region can be known a priori to a decoder based on the size of the region. As such, the process 1100 can determine the base probability by dividing the known count of vertices by the number of grid locations in the region.

At 1104, the process 1100 receives, in the compressed bitstream, at least one of row sums and column sums. The row sums include, for each row of at least some of the rows of the region, a respective count of a number of locations having the value in the row. The row sums can be encoded into the compressed bitstream as described with respect to FIG. 7. The column sums include, for each column of at least some of the columns of the region, a respective count of a number of locations having the value in the column. The column sums can be encoded into the compressed bitstream as described with respect to FIG. 7. Receiving the at least one of the row sums and the column sums includes decoding, from the compressed bitstream, the at least one of the row sums and the column sums.

At 1106, the process 1100 decode, from the compressed bitstream, at least one of the rows and the columns of the region based on decoding order. The process 1100 uses the received at least one of the row sums and the column sums to determine the decoding order.

In an implementation, decoding based on the decoding order the at least one of the rows and the columns of the region includes selecting a next row or column to decode and decoding the next row or column. The next row or column to decode corresponds to a most extreme probability as described with respect to FIG. 7. In an implementation, decoding the next row or column includes decoding the next row or column using progressive arithmetic coding as described with respect to FIG. 7.

In an implementation, decoding the next row or column includes, in a case of decoding a row, using the column sums to decode the row and, in a case of decoding a column, using the row sums to decode the column. Using the row sums to decode the column includes determining a probability model for decoding the column. The probability model can be as described with respect to the conditional probabilities 826 of the diagram 840B. Using the column sums to decode the row includes determining a probability model for decoding the row. The probability model is similar to the conditional probabilities 826 of the diagram 840B.

In an implementation, selecting the next row or column to decode includes, in a case where a first row or column and a second row or column are equivalent, selecting to decode the one of the first row or column and a second row or column resulting in the remaining probability becoming more extreme as described with respect to FIG. 7.

In an implementation, selecting the next row or column to decode further includes, in a case where the first row or column and the second row or column result in a tied most extreme remaining probability, selecting to decode the one of the first row or column that leaves other extremes least changed, as described with respect to FIG. 7.

In an implementation, the process 1100 can further include receiving an indication of a segmentation of the image into sub-tiles, the region being a sub-tile of the sub-tiles. For example, in a case where the region is split by an encoder into sub-tiles, such as described with respect to FIGS. 9-7, the process 1100 decodes the indication of the segmentation 10700. Each of the sub-tiles is decoded as described above with respect to the region and the region is constituted from the decoded sub-tiles.

As indicated above, some image compression systems (e.g., JPEG) or a neural network compression system can determine a set of descriptors that are encoded in a compressed bitstream. For example, a neural network can associate a respective stack of coefficients (i.e., numbers) with every 16×16 region of an image that the neutral network learns to decode.

In some systems, the stacks of coefficients are treated as having spatially invariant probability distributions: that is, the same probability model may be used for each of the stacks of coefficients regardless of the image location (i.e., image patch) the patch represents. For example, the same probability model may be used for a stack of coefficients that represents a patch that is at the top left of the image, a patch that is at the center of the image, a patch that is halfway between the top left and the center, or any other patch.

However, in reality, the statistics for the stacks of coefficients may be different depending on the type of "image patch" being represented by a stack of coefficients. For example, the statistics for the patches of an image that are parts of a clear, flat sky may be tightly concentrated near 0. On the other hand, the statistics of image patches that cover a bright polka-dot shirt may vary widely and may be unconcentrated. As such, it is desirable to signal to the decoder a category (e.g., a first category for clear sky and a second category for polka-dot shirt) of the image patch that a stack of coefficients belongs in or represents. The category can be used by the encoder and decoder to select an entropy coder. For example, high-variance Cauchy distributions can be used for heavily textured patches. For example, low-variance Laplacian distributions can be used for flat and low-textured patches.

Similarly, different entropy coders can be used based on the location of the occupancy map being encoded. As such, when encoding an occupancy map or a portion thereof, the encoder can signal, for the occupancy map, a location and/or a category. The location and/or category can be used by the encoder and the decoder to select an entropy coder for coding the occupancy map. For example, high-variance Cauchy distributions can be used for occupancy maps that are located in heavily textured patches. For example, low-variance Laplacian distributions can be used for occupancy maps that are located in flat and low-textured patches.

The stack of numbers for a region can be arithmetic-encoded and -decoded using a probability distribution. It is noted that the coefficients of a first stack that corresponds to a first region (e.g., an edge-region) that abuts an edge of an image and the coefficients of a second stack that corresponds to a second region (e.g., a smooth region) that does not abut an edge of an image can have radically different distributions. As such, the location of the region can be used as context for deriving a probability model for encoding the coefficients. That is, a probability model can be selected based on whether the 16×16 region corresponding to a stack is an edge region. As such, the encoder and decoder can have two distributions for encoding stacks: one distribution corresponding to the edge regions and a second corresponding to internal regions of the image. For a region, the encoder can encoder which distribution is to be used. While two regions and two respective distributions are discussed herein, any number of regions and respective probability models are possible.

In an example, a "1" can be coded to indicate that a stack was encoded using the edge-region probability model and a "0" for the stacks that are encoded using the smooth-region probability model. Other encodings are possible. In an example, the two probability models can be fixed and known to the encoder and the decoder. In an example, at least one of the probability models can be parametrized (e.g. "Cauchy with a gamma of 1"). In an example, the type of probability model (e.g., Cauchy) and parameter (e.g., gamma of 1) can be sent from the encoder to decoder. In an example, at least one of the probability models can be a frequency histogram transmitted from encoder to decoder. In an implementation, instead of the probability model itself being sent by the encoder for occupancy grid, it is the selection (e.g., an value indicative of the selection, an index, etc.) from two or more alternative distributions that is sent (i.e., encoded in the bitstream).

For simplicity of explanation, the processes 700 and 1100 are depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available. The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method of encoding occupancy information in a region of an image, the region having rows and columns, the method comprising:
    determining row sums for the region,
        wherein the row sums comprise, for each row of the region, a respective count of a number of locations in the row having a specified value, a location having the specified value being indicative of the occupancy information at the location;
    determining column sums for the region,
        wherein the column sums comprise, for each column of the region, a respective count of a number of locations in the column having the specified value;
    encoding, in a compressed bitstream, at least one of the row sums and the column sums; and
    encoding, in the compressed bitstream and based on a coding order, at least one of the rows and the columns of the region, wherein the coding order is based on the encoded at least one of the row sums and the column sums.

2. The method of claim 1, wherein encoding at least one of the row sums and the column sums comprises:
determining, based on a cost of encoding the region, whether to encode the row sums, the column sums, or both the row sums and the column sums.

3. The method of claim 1, wherein encoding at least one of the rows and the columns of the region comprises:
selecting a next row or column to encode, the next row or column to encode corresponding to a most extreme probability; and
encoding the next row or column.

4. The method of claim 3, wherein encoding the next row or column comprises:
encoding the next row or column using progressive arithmetic coding.

5. The method of claim 3, wherein encoding the next row or column comprises:
in a case of encoding a row, using the column sums to encode the row; and
in a case of encoding a column, using the row sums to encode the column.

6. The method of claim 3, wherein selecting the next row or column to encode comprises:
in a case where a first row or column and a second row or column are equivalent, selecting to encode the one of the first row or column and the second row or column resulting in the remaining probability being more extreme.

7. The method of claim 6, wherein selecting the next row or column to encode further comprises:
in a case where the first row or column and the second row or column result in a tied most extreme remaining probability, selecting to encode the one of the first row or column that leaves other extremes least changed.

8. The method of claim 1, further comprising:
splitting the image into sub-tiles, the region being a sub-tile of the sub-tiles; and encoding, in the compressed bitstream, an indication of the sub-tiles.

9. The method of claim 8, wherein splitting the image into sub-tiles comprises: determining whether to split a sub-tile into further sub-tiles based on a hypothetical encoding of the sub-tiles.

10. The method of claim 9, wherein the hypothetical encoding is a progressive arithmetic coding.

11. An apparatus for decoding occupancy information in a region of an image, the region comprising rows and columns, the apparatus comprising:
a memory; and
a processor, the processor configured to execute instructions stored in the memory to:
determine a base probability, the base probability being a probability of a location having a value in the region, the location having the value being indicative of the occupancy information at the location;
receive, in a compressed bitstream, at least one of row sums and column sums,
wherein the row sums comprise, for each row of at least some of the rows of the region, a respective count of a number of locations having the value in the row, and
wherein the column sums comprise, for each column of at least some of the columns of the region, a respective count of a number of locations having the value in the column; and
decode, from the compressed bitstream and based on a decoding order, at least one of the rows and the columns of the region,
wherein the decoding order is based on the received at least one of the row sums and the column sums.

12. The apparatus of claim 11, wherein to decode, from the compressed bitstream based on the decoding order, the at least one of the rows and the columns of the region comprises to:
select a next row or column to decode, the next row or column to decode corresponding to a most extreme probability; and
decode the next row or column.

13. The apparatus of claim 12, wherein to decode the next row or column comprises to:
decode the next row or column using progressive arithmetic coding.

14. The apparatus of claim 12, wherein to decode the next row or column comprises to:
in a case of decoding a row, use the column sums to decode the row; and
in a case of decoding a column, use the row sums to decode the column.

15. The apparatus of claim 12, wherein to select the next row or column to decode comprises to:
in a case where a first row or column and a second row or column are equivalent, select to decode the one of the first row or column and the second row or column resulting in the remaining probability being more extreme.

16. The apparatus of claim 15, wherein to select the next row or column to decode further comprises to:
in a case where the first row or column and the second row or column result in a tied most extreme remaining probability, select to decode the one of the first row or column that leaves other extremes least changed.

17. The apparatus of claim 11, the instructions further comprise instructions to:
receive an indication of a segmentation of the image into sub-tiles, the region being a sub-tile of the sub-tiles.

18. An apparatus for encoding a region of an image, the region having rows and columns, comprising:
a memory; and
a processor, the processor configured to execute instructions stored in the memory to:
determine row sums for the region,
the row sums comprise, for each row of at least some rows of the region, a respective count of a number of locations having a specified value;
determine column sums for the region,
the column sums comprise, for each column of at least some columns of the region, a respective count of a number of locations having the specified value;
encode, in a compressed bitstream, at least one of the row sums and the column sums; and
encode, in the compressed bitstream and based on a coding order, at least some one of the rows and the columns of the region,
wherein the coding order is based on the encoded at least one of the row sums and the column sums.

19. The apparatus of claim 18, wherein the instructions further includes instructions to:
encode, in the compressed bitstream, a count of locations of the region having the specified value.

20. The apparatus of claim 18, wherein the instructions further include instructions to:
  encode an indication of a segmentation of the image into sub-tiles, the region being a coextensive sub-tile of the sub-tiles.

* * * * *